(12) United States Patent
Fanghella et al.

(10) Patent No.: US 12,067,771 B2
(45) Date of Patent: Aug. 20, 2024

(54) OBJECT LOCATION DETERMINATION IN FRAMES OF A VIDEO STREAM

(71) Applicant: Telefonaktiebolaget LM Ericsson (publ), Stockholm (SE)

(72) Inventors: Alfredo Fanghella, Stockholm (SE); Volodya Grancharov, Solna (SE); Harald Pobloth, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 506 days.

(21) Appl. No.: 17/296,687

(22) PCT Filed: Dec. 5, 2018

(86) PCT No.: PCT/EP2018/083601
§ 371 (c)(1),
(2) Date: May 25, 2021

(87) PCT Pub. No.: WO2020/114585
PCT Pub. Date: Jun. 11, 2020

(65) Prior Publication Data
US 2022/0027623 A1    Jan. 27, 2022

(51) Int. Cl.
*G06V 20/10* (2022.01)
*G06T 7/73* (2017.01)
*G06V 20/40* (2022.01)

(52) U.S. Cl.
CPC ............ *G06V 20/10* (2022.01); *G06T 7/74* (2017.01); *G06V 20/40* (2022.01); *G06T 2207/10016* (2013.01)

(58) Field of Classification Search
CPC .......... G06V 20/10; G06V 20/40; G06T 7/74; G06T 2207/10016; G06T 7/246
USPC .................................................. 382/100, 103
See application file for complete search history.

(56) References Cited

U.S. PATENT DOCUMENTS

| 6,526,156 B1 * | 2/2003 | Black ..................... G06V 10/76 382/103 |
| 8,805,016 B2 * | 8/2014 | Lefevre ..................... G06T 7/20 382/103 |
| 9,665,804 B2 | 5/2017 | Sarkis et al. |
| 9,697,608 B1 | 7/2017 | Rybakov et al. |
| 10,346,465 B2 * | 7/2019 | Gao ..................... G06F 3/0488 |

(Continued)

OTHER PUBLICATIONS

Viola, P., et al., "Rapid Object Detection using a Boosted Cascade of Simple Features", Proceedings of the 2001 IEEE Computer Society Conference on Computer Vision and Pattern Recognition, CVPR, Dec. 8-14, 2001, pp. 1-9, Kauai, HI.

(Continued)

*Primary Examiner* — Sheela C Chawan
(74) *Attorney, Agent, or Firm* — Coats & Bennett, PLLC

(57) ABSTRACT

An object locating method comprises deciding, for at least one frame of a video stream and based on at least one parameter representative of a change between a scene represented by the at least one frame and a scene represented by a reference frame of the video stream, whether determination of a location of at least one object (11, 13, 15, 17, 19) in the at least one frame is based on object detection applied to the at least one frame, or is based on a transformation of a location of the at least one object (11, 13, 15, 17, 19) detected in the reference frame.

20 Claims, 14 Drawing Sheets

(56) References Cited

U.S. PATENT DOCUMENTS

2012/0154579 A1* 6/2012 Hampapur .............. G06T 7/223
382/103
2017/0053167 A1* 2/2017 Ren ......................... G06T 7/246
2017/0206430 A1* 7/2017 Abad ..................... H04N 23/60

OTHER PUBLICATIONS

Fischler, M., et al., "Random Sample Consensus: A Paradigm for Model Fitting with Applications to Image Analysis and Automated Cartography", Communications of the ACM, Jun. 1, 1981, pp. 381-395, vol. 24, No. 6.

Ren, S., et al., "Faster R-CNN: Towards Real-Time Object Detection with Region Proposal Networks", IEEE Transactions on Pattern Analysis and Machine Intelligence, Jan. 1, 2017, pp. 1-9.

Redmon, J., et al., "YOLO9000: Better, Faster, Stronger", 2017 IEEE Conference on Computer Vision and Pattern Recognition (CVPR), Jan. 1, 2017, pp. 6517-6525.

Shi, J., et al., "Good Features to Track", 1994 Proceedings of IEEE Conference on Computer Vision and Pattern Recognition (CVPR94), Jun. 1, 1994, pp. 1-8, Seattle, WA.

Lucas, B., et al., "An Iterative Image Registration Technique with an Application to Stereo Vision", IJCAI'81: Proceedings of the 7th International Joint Conference on Artificial Intelligence, Aug. 1, 1981, pp. 674-679, vol. 2., Vancouver, Canada.

Dollàr, P., et al., "Fast Feature Pyramids for Object Detection", IEEE Transactions on Pattern Analysis and Machine Intelligence, Aug. 1, 2014, pp. 1532-1545, vol. 36, No. 8.

Everingham, M., et al., "The PASCAL Visual Object Classes (VOC) Challenge", International Journal of Computer Vision (2010) 88, Jan. 1, 2010, pp. 303-338.

Deng, J., et al., "ImageNet: A Large-Scale Hierarchical Image Database", 2009 IEEE Conference on Computer Vision and Pattern Recognition, Jan. 1, 2009, pp. 1-8.

Liu, W., et al., "SSD: Single Shot MultiBox Detector", Proceedings of the European Conference on Computer Vision (ECCV), Mar. 30, 2016, pp. 1-15.

* cited by examiner

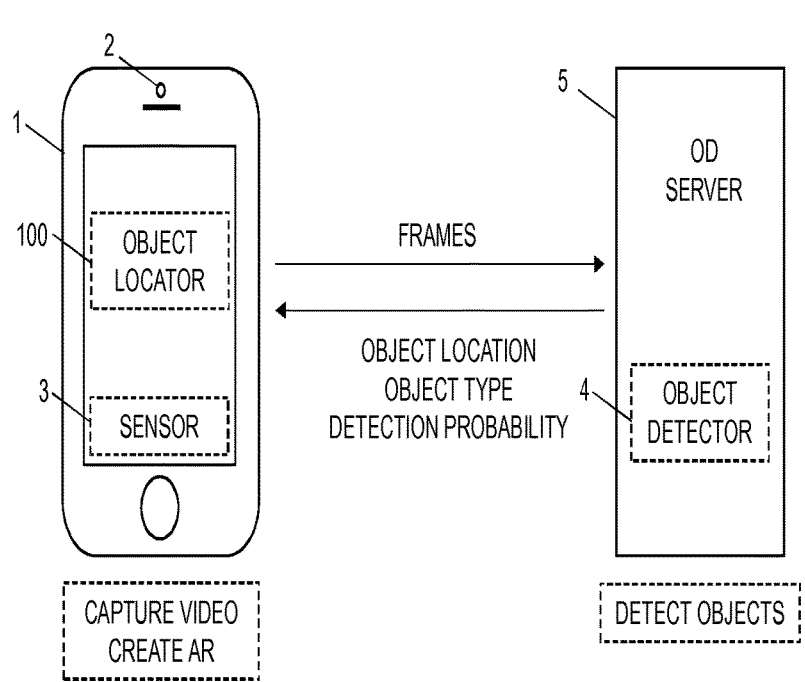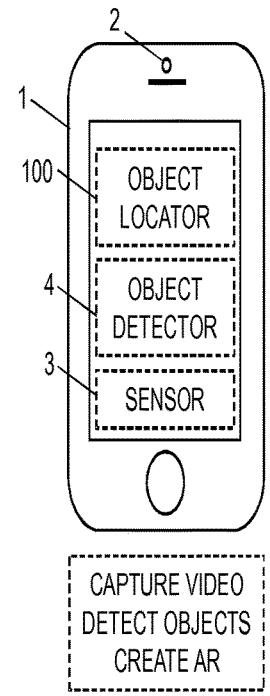
Fig. 1
Fig. 2

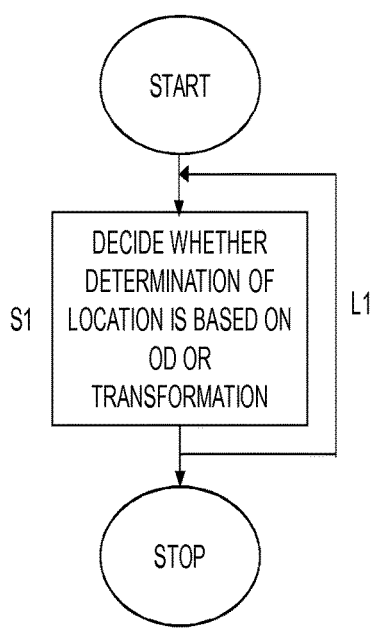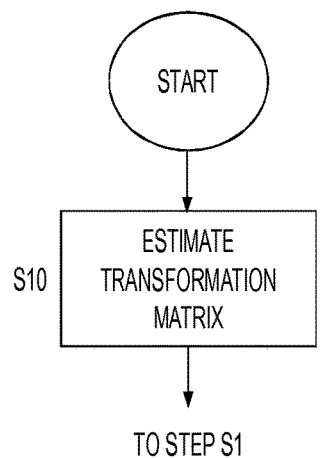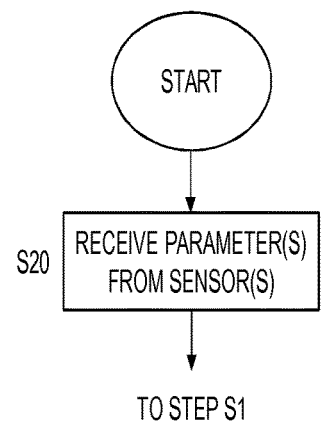
Fig. 8
Fig. 9
Fig. 10

OBJECT LOCATION DETERMINATION IN FRAMES OF A VIDEO STREAM

TECHNICAL FIELD

The invention generally relates to a method, an object locator, a computer program, a computer program 5 product and a user device for object location determination in frames of a video stream.

BACKGROUND

Augmented reality (AR) is a direct or indirect live view of a physical, real-world environment whose objects are augmented, i.e., perceptually enriched, by computer-generated perceptual information. The overlaid perceptual information can be constructive, i.e., additive to the natural environment, or destructive, i.e., masking of the natural environment.

An increasing number of AR applications for user devices, such as smart phones and tablets, have been developed to overlay virtual objects on the real-world view. The core technological challenges in such applications are:
1) identifying real-world objects and their positions on the screen, typically denoted object detection (OD) or object recognition in the art;
2) tracking objects of interest, typically denoted object tracking (OT) in the art; and
3) augmenting the scene with artificial objects, labels, or other types of perceptual information.

Previously, some of the best solutions in the area of object detection were considered to be based on Deformable Part Models (DPM) with Histogram of Oriented Gradients (HOG) features. In the last years, even more accurate solutions based on Convolutional Neural Network (CNN) technology are being considered as state of the art in the area of object detection. These solutions detect objects in a given frame or picture of a video stream, but require significant processing power to operate in real-time. Therefore, CNNs typically run on servers equipped with modern Graphics Processing Units (GPUs) with large amount of memory.

In some AR applications the object detection needs to run in real-time on a portable user device. A typical example is industrial AR applications, which, for instance, can be support tools for a technician fixing complex hardware systems. The portable user device, such as in the form of a hand-held device or a head-mounted device, then comprises a camera used to capture video that is input to the objection detection. If the camera of such a portable user device changes its position, the objection detection needs to run in almost every frame of the video stream in order to find locations of objects currently in the scene. However, due to the processing complexity of the objection detection and limited processing capabilities and power supply of the portable user device, running the objection detection in every frame is most often not possible.

This problem is traditionally solved by not running objection detection on every frame but rather run object detection periodically and instead track detected objects between consecutive objection detection runs. However, object tracking is typically less accurate as compared to object detection and objects could easily be lost. Object tracking, furthermore, cannot handle occlusion of tracked objects or detecting new objects entering the scene. Periodically running object detection is furthermore not computationally efficient if, for instance, the scene is static as the object tracking could easily handle such a static scene. Another problem with periodically running object detection is that if new objects enter the scene in between scheduled objection detection runs, these objects will not be visualized in time.

Hence, there is a need for a more efficient objection location determination that is suitable for implementation in portable user devices.

SUMMARY

It is a general objective to provide an object location determination that is suitable for implementation in portable user devices.

This and other objectives are met by aspects of the invention as well as embodiments as disclosed herein.

An aspect of the invention relates to an object locating method. The method comprises deciding, for at least one frame of a video stream and based on at least one parameter representative of a change between a scene represented by the at least one frame and a scene represented by a reference frame of the video stream, whether determination of a location of at least one object in the at least one frame is based on object detection applied to the at least one frame, or is based on a transformation of a location of the at least one object detected in the reference frame.

Another aspect of the invention relates to an object locator comprising a processing circuitry and a memory comprising instructions executable by the processing circuitry. The processing circuitry is operative to decide, for at least one frame of a video stream and based on at least one parameter representative of a change between a scene represented by the at least one frame and a scene represented by a reference frame of the video stream, whether determination of a location of at least one object in the at least one frame is based on object detection applied to the at least one frame, or is based on a transformation of a location of the at least one object detected in the reference frame.

A further aspect of the invention relates to a user device comprising an object locator according to above and a camera configured to record video and generate a video stream.

Yet another aspect of the invention relates to a computer program comprising instructions, which when executed by at least one processing circuitry, cause the at least one processing circuitry to decide, for at least one frame of a video stream and based on at least one parameter representative of a change between a scene represented by the at least one frame and a scene represented by a reference frame of the video stream, whether determination of the location of the at least one object in the at least one frame is based on the object detection applied to the at least one frame, or is based on the transformation of the location of the at least one objected detected in the reference frame.

A further aspect of the invention relates to a computer program product having stored thereon a computer program comprising instructions which, when executed on a processing circuitry, cause the processing circuitry to decide, for at least one frame of a video stream and based on at least one parameter representative of a change between a scene represented by the at least one frame and a scene represented by a reference frame of the video stream, whether determination of the location of the at least one object in the at least one frame is based on the object detection applied to the at least one frame, or is based on the transformation of the location of the at least one objected detected in the reference frame.

The invention provides a multi-mode technology for determining locations of objects in frames of a video stream. This multi-mode technology complements an object detection mode with a transformation mode, in which locations of objects in a reference frame are transformed or projected into locations in a current frame. The computational complexity in determining locations of objects in frames is reduced according to the invention by the transformation mode, thereby enabling implementation in portable user devices with limited computational and power resources. The multi-mode technology also enables visualization of perceptual information for objects that are fully or partially occluded.

BRIEF DESCRIPTION OF THE DRAWINGS

The embodiments, together with further objects and advantages thereof, may best be understood by making reference to the following description taken together with the accompanying drawings, in which:

FIG. 1 is an overview of a client—server architecture with object detection in the server;

FIG. 2 is an overview of a user device comprising an object detector;

FIG. 8 is a flow chart illustrating an object locating method according to an embodiment;

FIG. 9 is a flow chart illustrating an additional, optional step of the method shown in FIG. 8 according to an embodiment;

FIG. 10 is a flow chart illustrating an additional, optional step of the method shown in FIG. 8 according to another embodiment;

DETAILED DESCRIPTION

Figure 3:
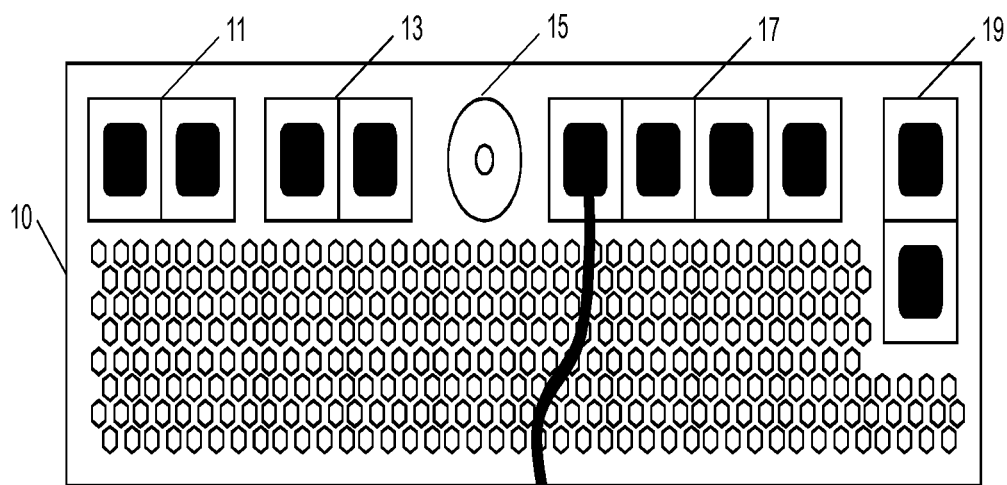
FIG. 3 schematically illustrates a scene of a frame of a video stream comprising objects, the location of which are to be determined.

Throughout the drawings, the same reference numbers are used for similar or corresponding elements. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention generally relates to a method, an object locator, a computer program, a computer program product and a user device for object location determination in frames of a video stream.

A user device—server architecture for augmented reality (AR) is shown in FIG. 1. The user device 1, represented by a portable and wireless user device 1 in FIG. 1, comprises or is connected to a camera 2 used to capture video and record a video stream. Pictures or video frames, for simplicity referred to as frames herein, of the video stream may then be sent from the user device 1 to an objection detection (OD) server 5. This frame transmission could involve streaming the video stream to the OD server 5, i.e., substantially transmitting all the frames of the video stream to the OD server 5. In an alternative embodiment, individual, typically timestamped frames are sent to the OD server 5 for object detection.

The OD server 5 comprises an object detector 4 for performing object detection on the received frames, or at least for a portion thereof. This object detection involves detecting objects in a processed frame and determining information of the detected object, including object location representation, detection probability and object type. Object location representation, typically referred to as bounding box in the art, defines a region of or within the processed frame. Detection probability represents a likelihood that the region of or within the frame defined by the object location representation comprises an object. Object type defines the type or class of the detected object, such as car, pedestrian, house, etc.

This so-called detection information, i.e., object location representation, detection probability and objection type, is returned to the user device 1 together with an indication of for which frame the object detection has been performed, such as in terms of a timestamp of the relevant frame. The detection information is then used by the user device 1 for augmentation of a video presented on a screen.

The OD server 5 may have access to offline trained Convolutional Neural Network based (CNN-based) object detectors and modern Graphics Processing Units (GPUs) with large amount of memory. Such CNNs typically comprise tens of millions of parameters trained offline on large annotated datasets, such as PASCAL VOC (Everingham, et al., "The PASCAL Visual Object Classes (VOC) challenge", *International Journal of Computer Vision* (2010) 88: 303-338) or ImageNet (Deng et al., "ImageNet: A large-scale hierarchical image database", in 2009 *IEEE Conference on Computer Vision and Pattern Recognition* (2009)).

Examples of such CNN-based object detectors 4 include Faster R-CNN (Ren et al., "Faster R-CNN: Towards real-time object detection with region proposal networks", *IEEE Transactions on Pattern Analysis and Machine Intelligence* (2017) 39(6): 1137-1149), SSD (Liu et al., "SSD: Single shot multibox detector", *Proceedings of the European Conference on Computer Vision* (ECCV) (2016)) and YOLO9000 (Redmon and Farhadi, "YOLO9000: Better, faster, stronger", 2017 *IEEE Conference on Computer Vision and Pattern Recognition* (CVPR) (2017)).

In another implementation example, the objection detector 4 is implemented in the user device 1 as shown in FIG. 2. Hence, then the user device 1 comprises both the camera 2 used to capture video and generate the video stream and the object detector 4 that processes frames of the video stream for the purpose of detecting objects therein. This implementation thereby relaxes the need for transmitting frames to a remote OD server 5 and receiving the detection information therefrom but instead requires implementation of the object detector 4 including the offline trained object detection model used by the object detector 4 at the user device 1.

Augmented reality finds ever more applications in portable user devices 1. A typical example is industrial AR applications, in which AR constitutes a support tool for technicians fixing complex hardware system. In such scenarios, the object detection should run in real-time, typically on the portable user device 1, which imposes limitations on the complexity of the object detector 4. The portability of the user device 1 and thereby of the camera 2 results, in most cases, in significant movement when the technician is engaged in fixing the hardware system. However, also in these cases objects in the video should still be accurately detected and visualized. If the camera 2 changes its position relative to the filmed hardware system, the object detection should generally be run in each frame of the video stream in order to detect and classify objects currently in the scene. However, due to complexity of the object detection and battery limitations of the portable user device 1 this is often not possible.

The present invention solves the above mentioned shortcomings when implementing AR applications in portable user devices 1 by an adaptive switching between an object detection mode and a transformation mode, also referred to a projection mode. This allows AR applications to run in real-time in portable user devices 1 and enables visualization of positions of objects in real time.

FIG. 8 is a flow chart illustrating an object locating method according to an embodiment. The method comprises step S1, which is performed for at least one frame of a video stream as is schematically indicated by the line L1. Step S1 comprises deciding, for the at least one frame and based on at least one parameter representative of a change between a scene represented by the at least one frame and a scene represented by a reference frame of the video stream, whether determination of a location of at least one object in the at least one frame is based on object detection applied to the at least one frame, or is based on a transformation of a location of the at least one object detected in the reference frame.

Hence, according to the invention, the location of at least one object in a frame can be determined either by applying object detection, i.e., a so-called object detection mode, or by transforming an already determined location of the object in a previous frame of the video stream, i.e., the reference frame, into a location in the current frame, i.e., a so-called transformation mode. The decision or choice between the object detection mode and the transformation mode is based on the at least one parameter representative of a change in scenes from the reference frame up to the current frame.

Object detection as used in the object detection mode is accurate but computationally intensive and power consuming. The location transformation used in the transformation mode is, however, comparatively less computationally complex. The invention thereby enables replacement of the computationally intense object detection in many of the frames of a video stream by the location transformation, thereby reducing the computation requirements and the power consumption for implementing AR in portable user devices 1.

The reference frame is a previous frame of the video stream, and more preferably a previous frame of the video stream for which object detection has been applied. Hence, the object detection applied to this reference frame detects at least one object in the reference frame and generates object location representations for the at least one detected object, and typically also detection probabilities and object type for each detected object.

Figure 4:
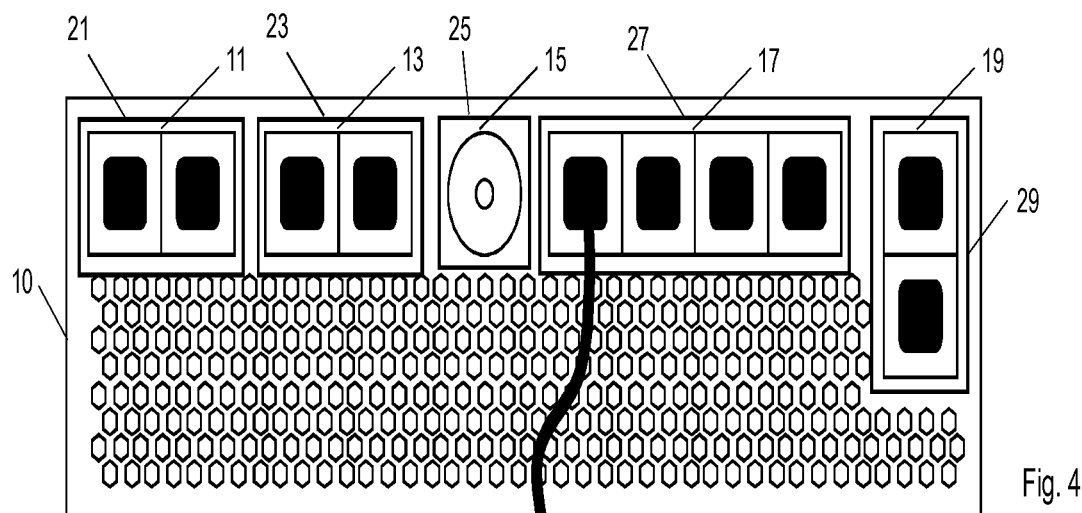
FIG. 4 schematically illustrates the scene of FIG. 3 augmented with bounding boxes determined in an object detection.

FIG. 3 illustrates an example of a hardware system in the form of a baseband switcher 10 comprising a number of connectors 11, 13, 15, 17, 19 as illustrative examples of objects of a scene to be detected and augmented by a portable user device. FIG. 4 illustrates the result of an object detection applied to the scene in FIG. 3, visualizing bounding boxes 21, 23, 25, 27, 29 around the detected objects 11, 13, 15, 17, 19. The bounding boxes 21, 23, 25, 27, 29 shown in FIG. 4 are examples of object location representations generated in the object detection applied to the reference frame. The object location representations thereby define a respective region, or bounding box, in the reference frame that comprises an object with a likelihood as represented by the detection probability and having a type as represented by the object type.

Hence, in an embodiment, object location representations generated by the object detection are bounding boxes. Each bounding box represents four parameter values defining a region of a frame. In such an embodiment, step S1 of FIG. 8 comprises deciding, based on the at least one parameter, whether determination of a bounding box defining a region in the at least one frame is based on the object detection applied to the at least one frame, or is based on the transformation of a bounding box in the reference frame.

The bounding box may, for instance, be in the form of a vector defining a coordinate of the region and a size of the region. The coordinate ($x_k$, $y_k$) could be any coordinate that allows identification of the position of the region in the frame. The coordinate could, for example, represent the center of the region or one of the corners of the region. The size of the region could be defined by a width ($w_k$) and a height ($h_k$) of the region as an illustrative, but non-limiting, example. Hence, in an embodiment the bounding box could be in the form of [$x_k$, $y_k$, $w_k$, $h_k$]. In an alternative embodiment, the bounding box could include coordinates of opposite corners of the region, i.e., [$x1_k$, $y1_k$, $x2_k$, $y2_k$].

Figure 5:
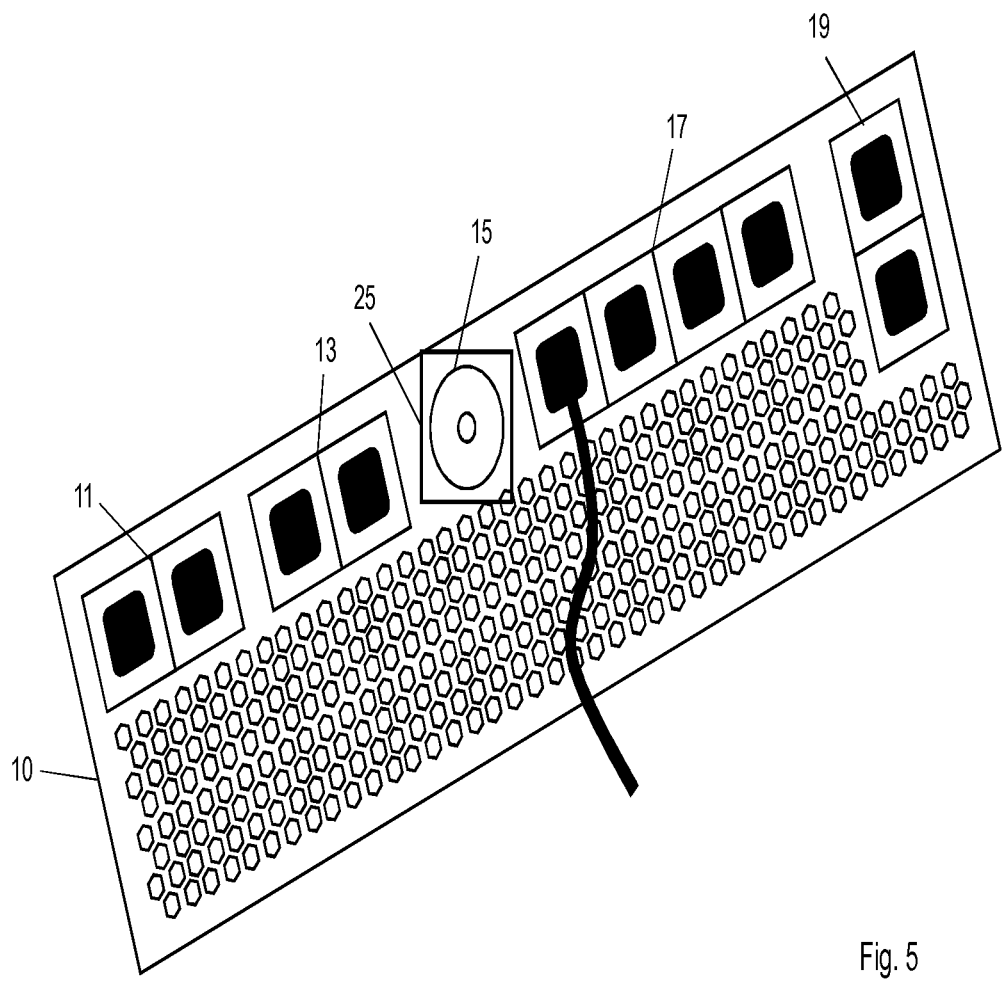
FIG. 5 schematically illustrates a scene of a subsequent frame of the video stream following rotation of the camera and augmented with a bounding box determined in an object detection.
Figure 6:
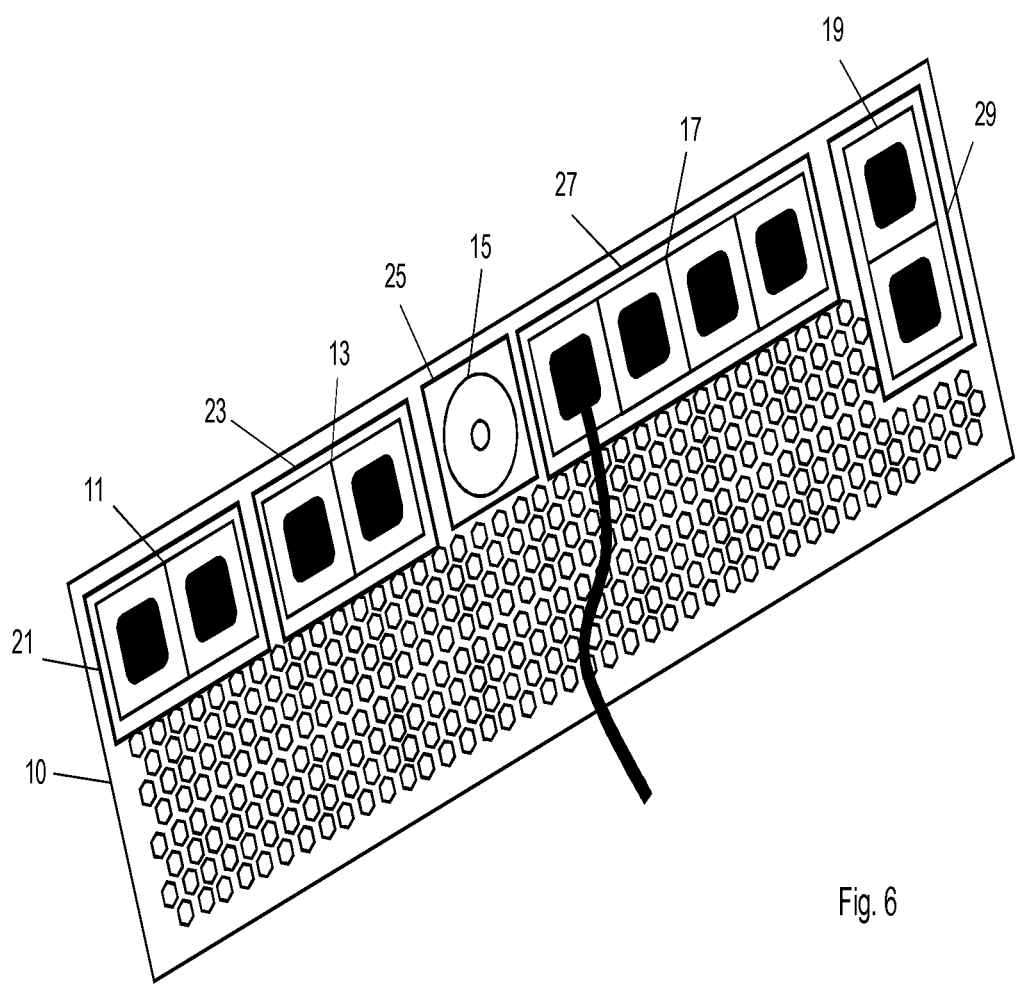
FIG. 6 schematically illustrates the scene in FIG. 5 augmented with bounding boxes determined based on a transformation operation.

The object detection models and algorithms traditionally used in object detection in frames of video streams output, as previously mentioned herein, for each detected object a bounding box, a detection probability and an object type. The bounding boxes are in most cases rectangles or squares defined by four parameters as described above. This may impose limitations when detecting objects if the imaged scene is rotated as shown in FIG. 5. The bounding boxes may then be misaligned with any rotated objects detected in the scene. An advantage with the transformation mode is that the transformation applied to bounding boxes of objects in the reference frame may involve various operations, such as rotation, rescaling, translation, etc. This means that even if a bounding box defines a rectangular region in the reference frame the transformed bounding box in the current frame, when applying the transformation mode, does not necessarily need to define a rectangular region. In clear contrast, the transformed bounding box could define a quadrilateral region in the current frame. Illustrative, but non-limiting, examples of such quadrilateral regions include irregular quadrilaterals (trapeziums), trapeziums (trapezoids), isosceles trapeziums (isosceles trapezoids), parallelograms, rhombi, rhomboids, kites, rectangles and squares. This is schematically illustrated in FIG. 6, where the rectangular and quadratic bounding boxes 21, 23, 25, 27, 29 from FIG. 4 have been transformed into the rhombi bounding boxes 21, 23, 25, 27, 29 shown in FIG. 6.

Hence, in an embodiment step S1 in FIG. 8 comprises deciding, based on the at least one parameter, whether to determine the bounding box defining a rectangular region in the at least one frame based on the object detection applied to the at least one frame or to determine the bounding box defining a quadrilateral region in the at least one frame based on the transformation of the bounding box in the reference frame.

The object detection used in the object detection mode could be according to any object detection algorithm implemented in an object detector. For instance, the objection detection could be in the form of a sliding-window objection detection, such as disclosed in Viola and Jones, "Rapid Object Detection using a Boosted Cascade of Simple Features", in Proceedings of the 2001 *IEEE Computer Society Conference on Computer Vision and Pattern Recognition*, CVPR 2001, Kauai, HI, U.S.; or Fischler and Bolles, "Random Sample Consensus: A Paradigm for Model Fitting with Applications to Image Analysis and Automated Cartography, *Communications of the ACM* (1981) 24(6): 381-395. Alternatively, the object detection could be in the form of CNN-based object detection such as the previously mentioned Faster R-CNN, SSD, or YOLO9000.

The object detection used in the object detection mode can be run by an object detector 4 implemented in the user device 1 as shown in FIG. 2. In another embodiment, the object detection is run at a remote object detector 4, such as implemented in an object detection server 5 as shown in FIG. 1. In such an embodiment, the user device 1 sends frames that should be subject to object detection to the remote object detector 4 and receives therefrom object detection information, i.e., the object location representations and typically also the detection probabilities and object types as previously disclosed herein. Running the object detection remotely has the advantage of utilizing powerful GPUs, such as in an OD server 5, to thereby use computationally intense object detection models and algorithms to run at acceptable frame rates. The shortcoming is that frames need to be sent to the remote object detector 4 and the detection information is returned therefrom, which, in situations of network congestion and heavy network load, could prolong the delivery of the detection information to the user device 1.

FIG. 5 illustrates a rotation of the scene due to the movement of the portable user device 1 used to film the baseband switcher 10. FIG. 5 shows the results of an object detection applied to the rotated scene. A significant limitation of object detection is that the bounding boxes determined during object detection are rectangular, thereby being less effective in handling rotated scenes. In FIG. 5, only one of the objects 15 have been correctly detected and visualized with a bounding box 25. FIG. 6 illustrates the same rotated scene as in FIG. 5 but when instead of applying object detection in the object detection mode, locations of the objects 11, 13, 15, 17, 19 are determined by transforming the locations of the objects 11, 13, 15, 17, 19 in the reference frame, see FIG. 4, into locations in the current frame in FIG. 6. The transformation mode can, as is shown in FIG. 6, effectively handle scene rotations and still visualize bounding boxes 21, 23, 25, 27, 29 that have been transformed, such as rotated, relative to the positions in the reference frame.

Figure 7A:
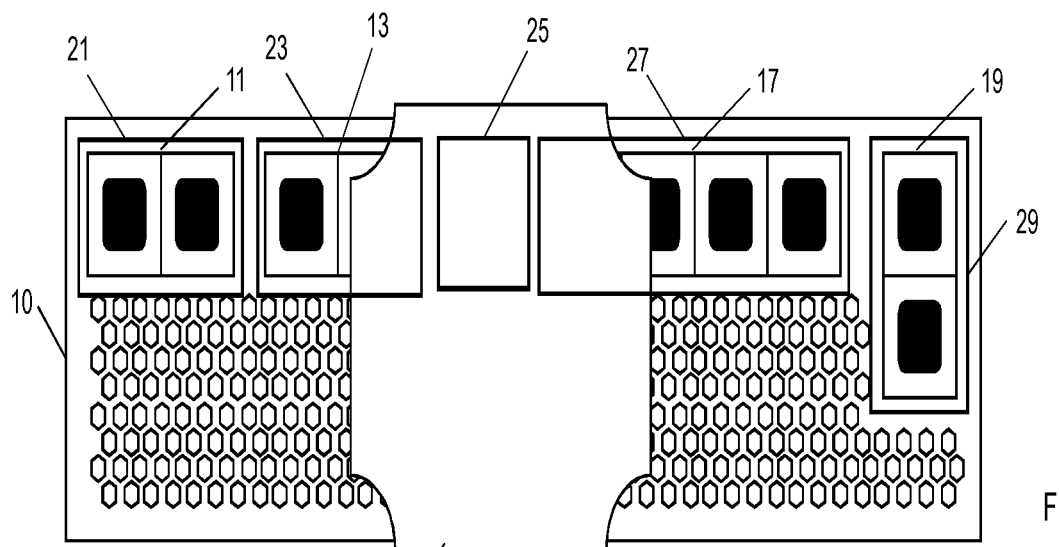
FIGS. 7A and 7B schematically illustrate a scene of a subsequent frame of the video stream following partial blocking of objects and augmented with bounding boxes determined based on a transformation operation (FIG. 7A) or based on objection detection (FIG. 7B)
Figure 7B:
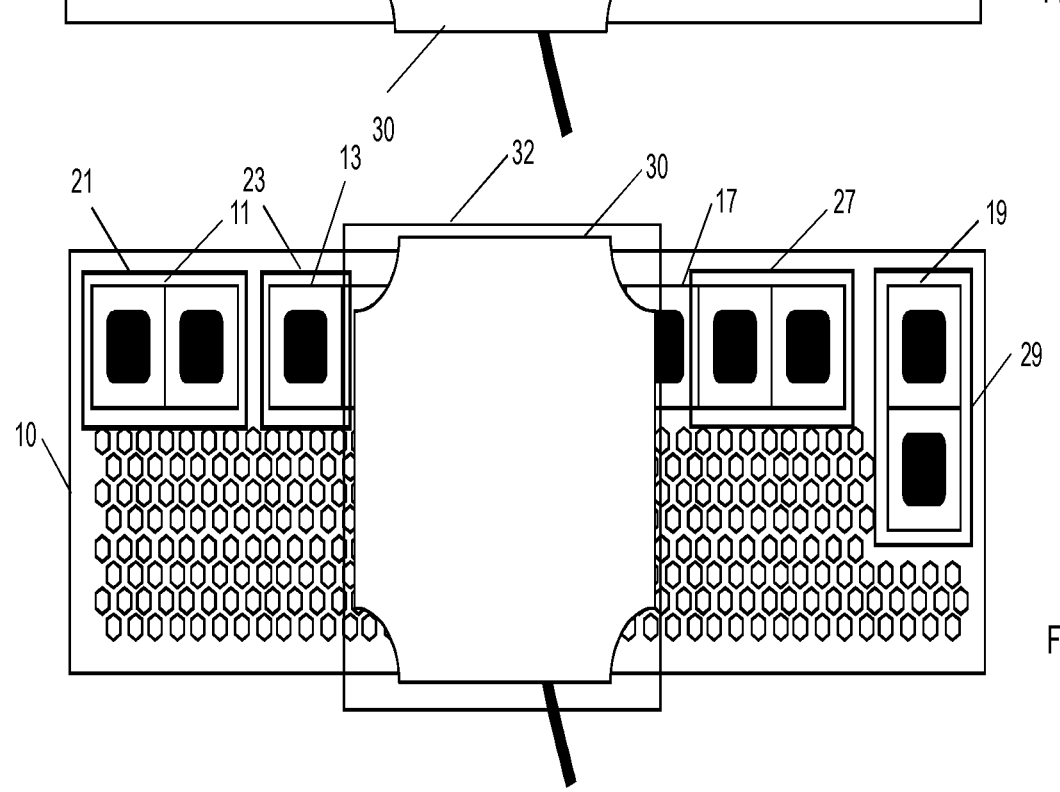

Another significant advantage of having access to the transformation mode is that this mode can handle occlusion of objects 13, 15, 17 as shown in FIG. 7A. In FIG. 7A, another object 30 is fully occluding the object with reference number 15 and partially occluding the objects 13, 17. However, by transforming the locations of these objects 13, 15, 17 from the reference frame in FIG. 4 into the current frame, the bounding boxes 23, 25, 27 for these objects 13, 15, 17 can still be correctly visualized. This is not possible when using the object detection mode or using prior art object tracking as shown in FIG. 7B. Hence, in FIG. 7B only objects 11, 19 are corrected detected, whereas only portions of objects 13, 17 are detected. No detection of object 15 is possible as it is hidden by the object 30. The figure also shows bounding boxes 21, 23, 27, 29, 32 for the detected objects 11, 13, 17, 19, 30.

FIG. 9 is a flow chart illustrating an additional, optional step of the method in FIG. 8 according to an embodiment. This embodiment comprises estimating or determining, in step S10, a transformation matrix based on reference key points derived from the reference frame and key points derived from the at least one frame. The transformation matrix defines a transformation of a location in the reference frame into a location in the at least one frame. The method then continues to step S1 in FIG. 8. In this embodiment, step S1 comprises deciding, based on the at least one parameter, whether determination of the location of the at least one object in the at least one frame is based on the object detection applied to the at least one frame, or is based on the transformation, using the transformation matrix, of the location of the at least one object detected in the reference frame.

The transformation matrix H defines a transformation of a location or position $L_r$ in the reference frame into a location or position $L_c$ in the current frame, i.e., $L_c = HL_r$.

Various types of transformation matrixes could be estimated in step S10 according to different embodiments. In a typical example, the transformation matrix defines a geometric transformation of locations between frames. A geometric transformation is a function whose domain and range are sets of points. Most often the domain and range of a geometric transformation are both $R^2$ or both $R^3$. Geometric transformations may be 1-1 functions, i.e., they have inverses. Illustrative, but non-limiting, examples of geometric transformations include affine transformation, which is a function between affine spaces that preserves points, straight lines and planes and thereby parallelism; projective transformation, which is a function between projective spaces that preserves collinearity; and a rotation-translation transformation.

The transformation matrix is estimated in step S10 based on key points derived from the reference frame and from the at least one frame. These key points are highly distinctive points or features that can be identified and preferably tracked from frame to frame in the video stream. Thus, so-called reference key points are derived from the reference frame in the video stream. In a particular embodiment, the reference key points are extracted from or identified in the reference frame. For instance, the reference key points can be identified in the reference frame using the Shi-Tomasi algorithm (Shi and Tomasi, "Good Features to Track", in 1994 *Proceedings of IEEE Conference on Computer Vision and Pattern Recognition*, CVPR94, Seattle, WA, U.S.).

Corresponding or matching key points are also derived from the at least one frame. In an embodiment, the reference key points identified in the reference frame are tracked or followed in subsequent frames of the video stream until reaching the current frame. The tracking can be performed according to various key point, feature or object tracking algorithms, for instance the Lucas-Kanade optical flow algorithm (Lucas and Kanade, "An Iterative Image Registration Technique with an Application to Stereo Vision", in *Proceedings of the 7th international joint conference on Artificial intelligence* (1981) 2: 674-679, Vancouver, Canada). In another embodiment, the key point identifying algorithm applied to the reference frame could anew be applied but then to the current frame in order to identify the key points corresponding to the reference key points in the reference frame.

Matched or corresponding key points as used herein refer to a same key point or feature in the reference frame as in the current frame. For instance, an upper left corner of a box identified as a reference key point in the reference frame is matching and corresponding to the upper left corner of the same box in the current frame even if the position of the box may have been changed from the reference frame to the current frame.

The transformation matrix can be estimated in step S10 based on the reference key points derived from the reference frame and the key points derived from the at least one frame. Various matrix estimation methods could be used in step S10. For instance, the elements of the transformation matrix could be estimated by means of least squares estimation (LSE). As an example, assume that n matched key points are derived from the reference frame and from the current frame:

$$D_r = \begin{bmatrix} x_1^r & \ldots & \ldots & x_n^r \\ y_1^r & \ldots & \ldots & y_n^r \\ 1 & \ldots & \ldots & 1 \end{bmatrix} \text{ and }$$

$$D_c = \begin{bmatrix} x_1^c & \ldots & \ldots & x_n^c \\ y_1^c & \ldots & \ldots & y_n^c \\ 1 & \ldots & \ldots & 1 \end{bmatrix}$$

wherein $(x_i^r, y_i^r)$ represents x and y coordinates of a reference key point in the reference frame and $(x_i^c, y_i^c)$ represents x and y coordinates of a matched key point in the current frame, $i \in [1, n]$. The estimation of the transformation matrix could then involve finding the optimal transformation in the form $$\begin{bmatrix} x_1^c & \ldots & \ldots & x_n^c \\ y_1^c & \ldots & \ldots & y_n^c \\ 1 & \ldots & \ldots & 1 \end{bmatrix} = \begin{bmatrix} h_{11} & h_{12} & h_{13} \\ h_{21} & h_{22} & h_{23} \\ 0 & 0 & 1 \end{bmatrix} \begin{bmatrix} x_1^r & \ldots & \ldots & x_n^r \\ y_1^r & \ldots & \ldots & y_n^r \\ 1 & \ldots & \ldots & 1 \end{bmatrix}$$

wherein the transformation matrix is $$H = \begin{bmatrix} h_{11} & h_{12} & h_{13} \\ h_{21} & h_{22} & h_{23} \\ 0 & 0 & 1 \end{bmatrix}.$$

The LSE solution to obtain the transformation matrix H is given by $H = D_c D_r^T (D_r D_r^T)^{-1}$. Other algorithms and methods of estimating transformation matrices from two sets, preferably two balanced sets, i.e., the same number of key points in both sets, could be used. An illustrative, but non-limiting, example of such another algorithm or method is RANSAC (Fischler and Bolles, "Random Sample Consensus: A Paradigm for Model Fitting with Applications to Image Analysis and Automated Cartography, *Communications of the ACM* (1981) 24(6): 381-395).

The transformation matrix then transforms a location $(x^r, y^r)$ in the reference frame into a location $(x^c, y^c)$ in the current frame:

$$\begin{bmatrix} x^c \\ y^c \\ 1 \end{bmatrix} = H \begin{bmatrix} x^r \\ y^r \\ 1 \end{bmatrix}$$

In an embodiment, step S1 comprises deciding, based on the at least one parameter derived from the transformation matrix, whether determination of the location of the at least one object in the at least one frame is based on the object detection applied to the at least one frame, or is based on the transformation, using the transformation matrix, of the location of the at least one object detected in the reference frame.

Hence, in this embodiment at least one parameter derived from the transformation matrix is used as parameter representative of a change between the scene represented by the at least one frame and the scene represented by the reference frame.

In an embodiment, the transformation matrix is parameterized as:

$$H = \begin{bmatrix} s_x \cos\varphi & -s_x \sin\varphi & t_x \\ s_y \sin\varphi & s_y \cos\varphi & t_y \\ 0 & 0 & 1 \end{bmatrix}$$

wherein $t_x = h_{13}$ $t_y = h_{23}$ $s_x = \sqrt{h_{11}^2 + h_{21}^2}$ $s_y = \sqrt{h_{12}^2 + h_{22}^2}$ $\varphi = a\tan 2(-h_{12}, h_{11})$ Here $s_x$, $s_y$ are the horizontal and vertical scaling factors, $\varphi$ is a rotation angle, and $t_x$, $t_y$ are horizontal and vertical translations.

Any of these parameters, i.e., scaling factors, rotation angle and translations, or any combination of these parameters could be used as a basis for the decision whether determination of the location of the at least one object is based on the object detection, or is based on the transformation in step S1 in FIG. 8.

Instead of, or as an alternative to, using at least one parameter derived from the transformation matrix another parameter or other parameters representative of a change between the scene represented by the at least one frame and the scene represented by the reference frame could be used as a basis for the decision in step S1 in FIG. 8. For instance, the at least one parameter could be received from at least one sensor of the user device as shown in step S20 of FIG. 10. In this embodiment, the user device 1 comprises one or more sensors 2, 3 that can be used to generate or determine the at least one parameter. Illustrative, but non-limiting, examples of such sensors 2, 3 include an accelerometer, a magnetometer, a gyroscope and a camera, see FIGS. 1 and 2.

For instance, operating systems of wireless communication devices, such as smart phones, including Android and iOS, offer application programming interfaces (APIs) to obtain approximate rotation angles of the wireless communication devices. These operating systems also offer access to raw data from various sensors, such as cameras, accelerometers, magnetometers and gyroscopes, which could be used to estimate positions and thereby translations of the wireless communication devices.

For instance, the function getDefaultSensor(SENSOR_TYPE_ROTATION_VECTOR) reports the orientation of a wireless communication device running Android relative to the East-North-Up coordinates frame. It is usually obtained by integration of accelerometer, gyroscope and magnetometer readings. For more information see https://source.android.com/devices/sensors/sensor-types#rotation vector. Correspondingly, the CMAttitude class offers the orientation of a wireless communication device running iOS, see https://developer.appe.com/documentation/coremotion/cmattitude.

There is also a trend that operating systems running in wireless communication devices, such as smartphones, include simultaneous localization and mapping (SLAM) functionality. SLAM include algorithms to estimate location and orientation from both the camera and other sensors in the wireless communication device. For instance, Android supports the ARCore library (https://developers.google.com/ar/reference/java/com/google/ar/core/Camera#getDisplayOrientedPose( )) and iOS supports the ARKit library (https://developer.apple.com/documentation/arkit/arcamera).

Hence, given the position and orientation of the user device as obtained from at least one sensor, the at least one parameter representative of the change between the scene represented by the at least one frame and the scene represented by the reference frame can be calculated, such as by calculating scene rotation, scene translation and/or scene scaling.

Figure 11:
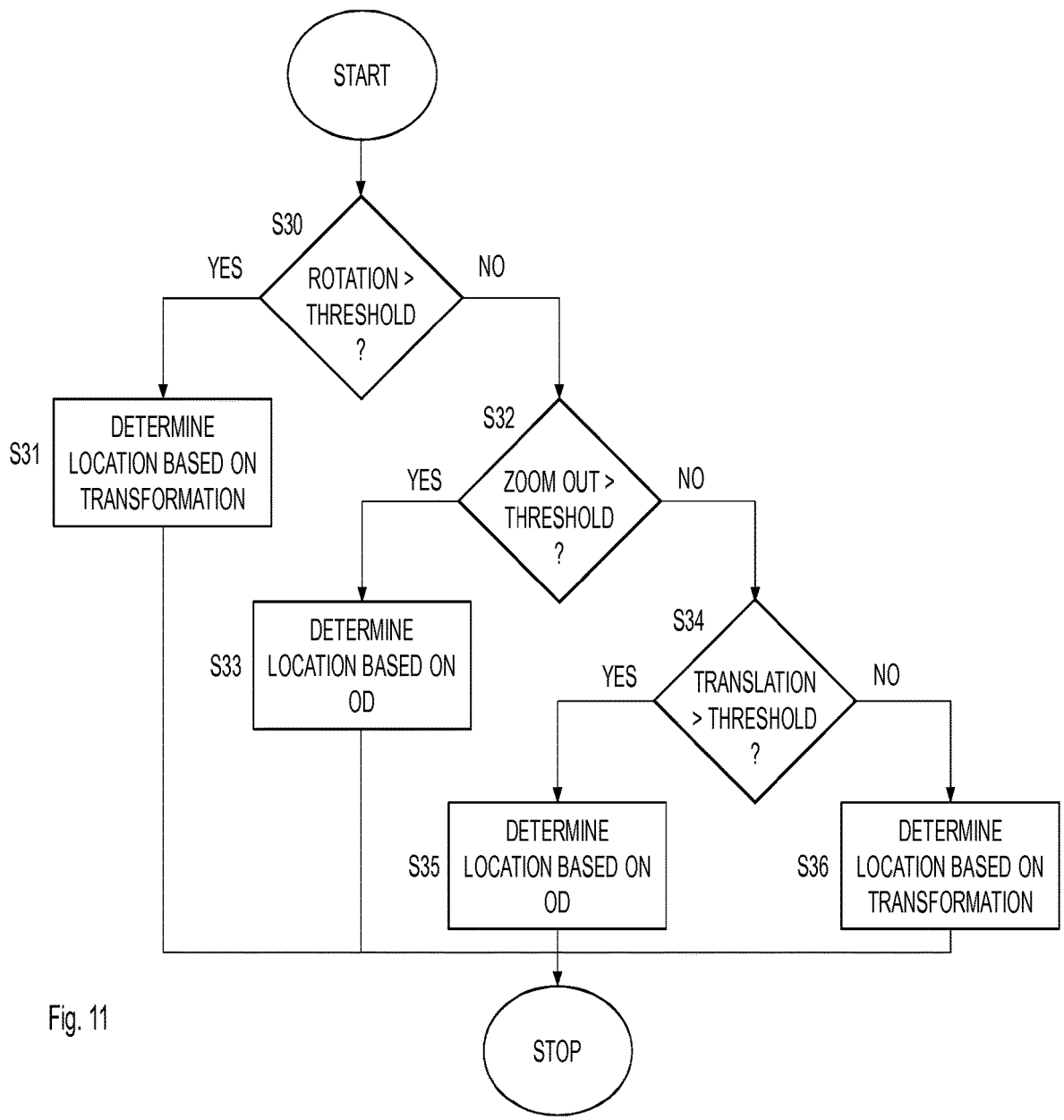
FIG. 11 is a flow chart illustrating an object locating method according to various embodiments.

FIG. 11 is a flow chart illustrating an object locating method according to various embodiments. In an embodiment, step S1 as shown in FIG. 8 comprises steps S31, S33, S35 and S36 as shown in FIG. 11.

In this embodiment, step S31 comprises determining the location of the at least one object in the at least one frame based on the transformation of the location of the at least one object detected in the reference frame if any rotation of the scene represented by the at least one frame relative to the scene represented by the reference frame exceeds a threshold rotation.

In an embodiment, the method also comprises the optional step S30, which comprises comparing the rotation of the scene with the threshold rotation. If the rotation of the scene exceeds the threshold rotation the method continues to step S31.

Thus, if the scene represented by the current frame has rotated more than the threshold rotation relative to the scene represented by the reference frame then the location of the at least one object in the current frame is determined according the so-called transformation mode, i.e., based on the transformation of the location of the at least one object detected in the reference frame.

FIG. 6 illustrates a rotation of the scene relative to the reference frame shown in FIG. 4. As is clearly shown in FIG. 6, the transformation applied in step S31 on the bounding boxes 21, 23, 25, 27, 29 around the objects 11, 13, 15, 17, 19 can rotate and optionally translate the bounding boxes 21, 23, 25, 27, 29 to be present around in the objects 11, 13, 15, 17, 19 even after a scene rotation. Such a scene rotation cannot efficiently be handled if the objection detection mode would instead have been used as shown in FIG. 5. The transformation mode can, as is shown in FIG. 6, effectively handle scene rotations and still visualize bounding boxes 21, 23, 25, 27, 29 that have been transformed, such as rotated, relative to the positions in the reference frame.

If the rotation of the scene does not exceed the threshold rotation, such as verified in the optional step S30, the location of the at least one object in the at least one frame is determined in step S33 based on the object detection applied to the at least one frame if any zoom out of the scene represented by the at least one frame relative to the scene represented by the reference frame exceeds a threshold zoom out.

In an embodiment, the method also comprises the optional step S32, which comprises comparing the zoom out of the scene with the threshold zoom out. If the zoom out of the scene exceeds the threshold zoom out the method continues to step S33.

Thus, if the scene represented by the current frame represents a zoomed out version of the scene represented by the reference frame then the location of the at least one object in the current frame is determined according the object detection mode, i.e., based on the object detection applied to the current frame.

A reason for using the object detection mode rather than the transformation mode in the case of large or heavy zoom outs (exceeding the threshold zoom out) is that by zooming out there is a large probability that new objects enter the scene and where these objects were not present in the scene represented by the reference frame. Hence, for these new objects entering the scene there are no corresponding objects in the scene represented by the reference frame. A typical example would be to have a reference frame in which the camera zoomed into the left part of the baseband switcher 10 in FIG. 3. In such a case, the only object present in the scene would be object 11. If the camera is then zoomed out to capture the full baseband switcher 10 then new objects 13, 15, 17, 19 will appear in the scene. The transformation of locations between scenes applied in the transformation mode is only effective for objects that are already present and detected in the scene represented by the reference frame. This means that for heavy zooming out operations that most likely introduce new objects, the object detection should instead be used in order to determine the location of the at least one object in the current frame in step S33.

If the zoom out of the scene does not exceed the threshold zoom out, such as verified in the optional step S32, the location of the at least one object in the at least one frame is determined in step S35 based on the object detection applied to the at least one frame if any translation of the scene represented by the at least one frame relative to the scene represented by the reference frame exceeds a threshold translation.

In an embodiment, the method also comprises the optional step S34, which comprises comparing the translation of the scene with the threshold translation. If the translation of the scene exceeds the threshold translation the method continues to step S35.

The translation of the scene could be a translation of the scene in the x direction, a translation of the scene in the y direction or any translation regardless of the direction. For instance, assume that the upper left corner of the baseband switcher 10 corresponds to pixel (2, 9) in the reference frame and corresponds to pixel (25, 17) in the current frame. In such a case, the translation of the scene in the x direction is 25−2=23 pixels, the translation of the scene in the y direction is 17−9=8 pixels and a general translation may, for instance, be $\sqrt{(25-2)^2+(17-9)^2} \approx 24.35$ pixels.

A reason for using the object detection mode rather than the transformation mode in the case of large translations is substantially the same as for zoom out, i.e., the risk of having new objects entering the current frame and wherein these objects were not present nor detected in the reference frame.

If the translation of the scene does not exceed the threshold translation, such as verified in the optional step S34, the location of the at least one object in the at least one frame is determined in step S36 based on the transformation of the location of the at least one object detected in the reference frame.

In other words, in an embodiment the object detection mode is only used in the case of heavy zoom outs and translations, whereas the transformation mode is used in the case of heavy rotations and in all other cases in which the object detection mode is not used.

The order of the comparisons in the optional steps S30, S32 and S34 may change, such as in any of the following orders S30, S34 and S32; S32, S30 and S34; S32, S34 and S30; S34, S30 and S32; or S34, S32 and S30.

Figure 12:
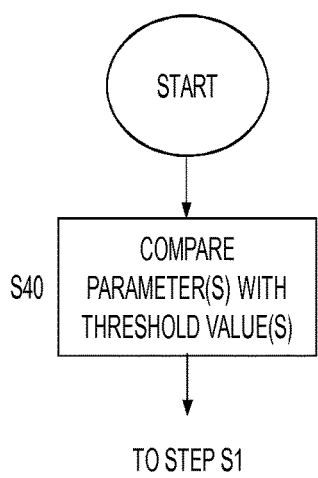
FIG. 12 is a flow chart illustrating an additional, optional step of the method shown in FIG. 8 according to an embodiment.

FIG. 12 is a flow chart illustrating an additional optional step of the method shown in FIG. 8 according to an embodiment. This embodiment comprises comparing the at least one parameter with a respective threshold value. The method then continues to step S1 in FIG. 8. In this embodiment, step S1 comprises deciding, based on the comparison, whether determination of the location of the at least one object in the at least one frame is based on the object detection applied to the at least one frame, or is based on the transformation of the location of the at least one objected detected in the reference frame.

Step S40 could be performed according to any of steps S30, S32 and S34 as shown in FIG. 11.

In an embodiment, the at least one parameter comprises a rotation angle φ. In this embodiment, the method comprises determining, in step S31 of FIG. 11, the location of the at least one object in the at least one frame based on the transformation of the location of the at least one object detected in the reference frame if $\varphi > \theta_\varphi$ and otherwise determining, in step S33 or S35, the location of the at least one object in the at least one frame based on the object detection applied to the at least one frame. In this embodiment, $\theta_{100}$ is a threshold value, such as the previously mentioned threshold rotation.

In an alternative, or additional, embodiment, the at least one parameter comprises a horizontal scaling factor $s_x$ and a vertical scaling factor $s_y$. In this embodiment, the method comprises determining, in step S33, the location of the at least one object in the at least one frame based on the object detection applied to the at least one frame if $\sqrt{s_x^{2}+s_y^{2}} < \theta_s$ and otherwise determining, in step S36, the location of the at least one object in the at least one frame based on the transformation of the location of the at least one object detected in the reference frame. In this embodiment, $\theta_s$ is a threshold value.

In this embodiment, low values of the scaling factors represent a heavy zoom out.

In an alternative, or additional, embodiment, the at least one parameter comprises a horizontal translation $t_x$ and a vertical translation $t_y$. In this embodiment, the method comprises determining, in step S35, the location of the at least one object in the at least one frame based on the object detection applied to the at least one frame if $\sqrt{t_x^2+t_y^2} > \theta_t$ and otherwise determining, in step S36, the location of the at least one object in the at least one frame based on the transformation of the location of the at least one object detected in the reference frame. In this embodiment, $\theta_t$ is a threshold value, such as the previously mentioned threshold translation.

Hence, as disclosed above, any of the above examples of parameters could be used alone in the decision or selection of whether to use the object detection mode or the transformation mode. In another embodiment, at least two of the above parameters could be used in the decision or selection of whether to use the object detection mode or the transformation mode, such as rotation and zoom out, rotation and translation, or zoom out and translation, or all three parameters could be used in the decision or selection whether to use the object detection mode or the transformation mode.

In this latter case, the at least one parameter comprises the horizontal scaling factor $s_x$, the vertical scaling factor $s_y$, the rotation angle φ, the horizontal translation $t_x$ and the vertical translation $t_y$. The method then comprises determining, in step S31, the location of the at least one object in the at least one frame based on the transformation of the location of the at least one object detected in the reference frame if $\varphi > \theta_\varphi$. However, if $\varphi \leq \theta_\varphi$, the method comprises determining, in step S33 or S35, the location of the at least one object in the at least one frame based on the object detection applied to the at least one frame if $\sqrt{s_x^{2}+s_y^{2}} < \theta_s$ or $\sqrt{t_x^2+t_y^2} > \theta_t$ and otherwise determining, in step S36, the location of the at least one object in the at least one frame based on the transformation of the location of the at least one object detected in the reference frame.

Figure 13:
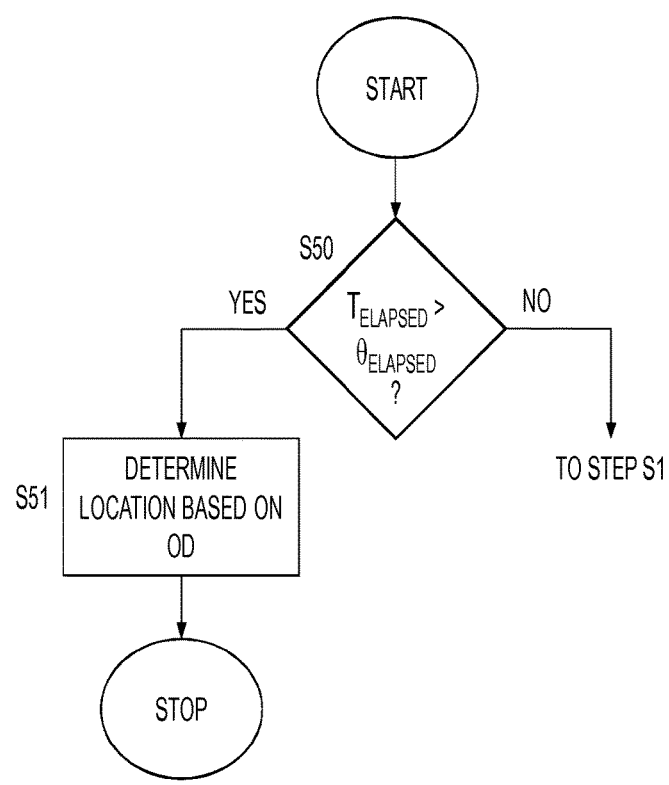
FIG. 13 is a flow chart illustrating additional, optional steps of the method shown in FIG. 8 according to an embodiment.

In an embodiment, the method comprises additional steps S50 and S51 as shown in FIG. 13. Step S50 comprises comparing a time parameter $T_{elapsed}$, representing a time period from the reference frame to the at least one frame in the video stream, with a threshold value $\theta_{elapsed}$. The method then continues to step S51 if $T_{elapsed} > \theta_{elapsed}$. Step S51 comprises determining the location of the at least one object in the at least one frame based on the object detection applied to the at least one frame. However, if $T_{elapsed} \leq \theta_{elapsed}$ the method continues to step 51 in FIG. 8.

In another embodiment, the time parameter is used together with the scaling factors and translations when deciding or selecting whether to use the object detection mode or the transformation mode. In this embodiment, the method comprises determining, in step S31, the location of the at least one object in the at least one frame based on the transformation of the location of the at least one object detected in the reference frame if $\varphi > \theta_\varphi$. However, if $\varphi \leq \theta_\varphi$, the method comprises determining, in step S33 or S35, the location of the at least one object in the at least one frame based on the object detection applied to the at least one frame if $\sqrt{s_x^{2}+s_y^{2}} < \theta_s$ or $\sqrt{t_x^2+t_y^2} > \theta_t$ or $T_{elapsed} > \theta_{elapsed}$ and otherwise determining, in step S36, the location of the at least one object in the at least one frame based on the transformation of the location of the at least one object detected in the reference frame.

This embodiment thereby introduces an initial check or criterion prior to deciding whether determination of the location of the at least one object is according to the object detection mode, or is according to the transformation mode. This initial check verifies that the reference frame is still up to date, i.e., that not too long time has passed from the reference frame in the video stream up to the current frame in the video stream. For instance, if the reference frame had frame number 5 in the video stream and the current frame is frame number 305, the reference frame might not be that good reference for any objects in the current frame since the scene has most likely changed quite a lot during these 300 frames. In such a case, it is instead better to apply object detection to the current frame in order to determine the locations of any objects.

The time parameter could represent time in the form of seconds, such $T_{elapsed}$ seconds. In another example, the time parameter represents a number of frames, such as $T_{elapsed}$ frames. These examples are equivalent since given frame numbers and the frame rate of the video stream it is possible to convert a difference in frames into a time, such as 300 frames represent 10 seconds of video using a frame rate of 30 fps. It is also possible to convert a time into a number of frames using the frame rate.

In an embodiment, if object detection is applied to the at least one frame, such as in step S33 or S35 in FIG. 11, then the at least one frame can be used as reference frame for a subsequent or following frame of the video stream.

In an embodiment, the reference frame is the most recent frame in the video stream for which object detection has been applied to determine location of at least one object. Hence, if a current frame of the video stream has frame number j then the reference frame is, in this embodiment, a frame for which object detection has been applied and having frame number j-k, wherein k is as low number as possible. Although it is generally preferred to use the most recent frame for which object detection has been applied as reference frame for any subsequent frame in the video stream, the embodiments are not limited thereto. This means that another frame for which object detection has been applied than the most recently preceding reference frame could instead be used reference frame, i.e., use frame number j-l as reference frame instead for frame number j-k, wherein l>k and the frames with frame numbers j-k and j-l both contain at least one object detected using object detection, such as in steps S33 of S35 in FIG. 11. This latter embodiment is, in particular, useful in connection with using the above mentioned time parameter $T_{elapsed}$ that makes sure that no outdated previous frames are used as reference frames for a current frame.

Figure 14:
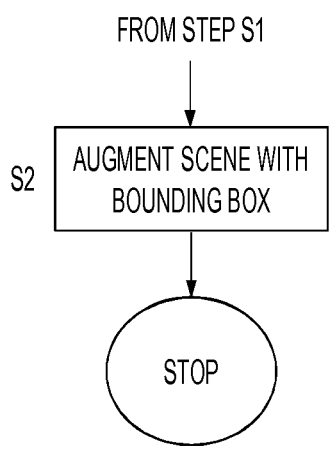
FIG. 14 is a flow chart illustrating an additional, optional step of the method shown in FIG. 8 according to an embodiment.

FIG. 14 is a flow chart illustrating an additional, optional step of the method shown in FIG. 8. Step S2 comprises augmenting the at least one frame with perceptual information based on the location of the at least one object in the at least one frame. The augmented at least one frame may then output for display on a screen of the user device.

Thus, by using the location of any objects determined according to the embodiments either according to the object detection mode or the transformation mode, the at least one frame can be augmented with perceptual information based on the locations of the objects.

In a particular embodiment, the type of perceptual information to augment the at least one frame can be selected based on the type of the objects as determined in the object detection.

Perceptual information as used herein relates to any information or data that could be used to augment a scene. Non-limiting, but illustrative, examples of such perceptual information includes name of a detected building, name of a detected person, etc.

Examples of perceptual information could be bounding boxes 21, 23, 25, 27, 29 around the objects as shown in FIGS. 3 to 7B. The visualized bounding boxes 21, 23, 25, 27, 29 may optionally be complemented with information or identifiers of the objects 11, 13, 15, 17, 19 enclosed by the bounding boxes 21, 23, 25, 27, 29. This information or identifiers could, for instance, identify the name or type of connector in the baseband switcher 10.

In a particular embodiment, the proposed method comprises four main steps:
  A. Object detection: Run the object detection in a reference frame to obtain the bounding boxes for objects of interest.
  B. Projection: Use a sparse point-to-point matching to find a transformation matrix H that projects the reference frame, such as the last frame that went through the objection detection step A, to the current frame. Project the bounding boxes detected in the reference frame to the current frame using the transformation matrix.
  C. Frame evaluation: Evaluate the parameters in the transformation matrix or from a sensor and decide when to switch between objection detection step A and projection step B.
  D. Visualization: Draw the detected or projected bounding boxes in the current frame and render it on the screen.

In this particular embodiment, the object detection step could be performed by sliding-window object detection or CNN-based object detection as illustrative examples. The object detection takes a frame as input and outputs bounding boxes of detected objects. The projection step is based on estimation of a transformation matrix. This transformation matrix is, in this particular embodiment, obtained by first extracting highly distinctive points, i.e., key points, from the reference frame and tracking them in subsequent frames.

Next the transformation matrix is estimated from the matched key points extracted from the reference frame and tracked in the current frame.

The four main steps of the proposed algorithm could be implemented, in an embodiment, according to:
1. Get a reference frame from the video source, e.g. the camera of the user device, as a current frame.
2. Run object detection on the current frame to find objects and bounding boxes.
3. Extract reference key points from the current frame, such as using the Shi-Tomasi algorithm.
4. Draw the bounding boxes and render the augmented frame on the screen of the user device.
5. For each subsequent frame do:
   a. Find the current location for the key points, such as using the Lucas-Kanade algorithm.
   b. Use the reference key points from step 3 and their current locations to estimate a transformation matrix, such as using LSE or RANSAC.
   c. Calculate $s_x$, $s_y$, $\varphi$, $t_x$ and $t_y$ from the transformation matrix and/or from sensor data.
   d. If $\varphi > \Theta_\varphi$ go to step 5f, else continue to step 5e. Here $\Theta_\varphi$ is a predefined angle threshold, such as with a value of 5°.
   e. If $\sqrt{s_x^2 + s_y^2} < \Theta_s$ or $\sqrt{t_x^2 + t_y^2} > \Theta_t$ or $T_{elapsed} > \Theta_{elapsed}$, heavy zoom out/heavy shift has occurred or elapsed time $T_{elapsed}$ has exceeded the allowed threshold, go to step 2, else continue to step 5f. Here $\Theta_s$ and $\Theta_t$ are thresholds. The values of these thresholds are preferably proportional to the size of the smallest object detected. $\Theta_{elapsed}$ is pre-determined interval, such as equal to 3 s.
   f. Use the transformation matrix to transform or project bounding boxes from step 2 into the current frame.
   g. Draw the bounding boxes and render the augmented frame on the screen of the user device.

In another embodiment, of this particular algorithm the check between the elapsed time $T_{elapsed}$ and its threshold $\Theta_{elapsed}$ is performed as a separate step between step 5c and step 5d.

Another aspect of the embodiments relates to an object locator comprising a processing circuitry and a memory comprising instructions executable by the processing circuitry. The processing circuitry is operative to decide, for at least one frame of a video stream and based on at least one parameter representative of a change between a scene represented by the at least one frame and a scene represented by a reference frame of the video stream, whether determination of a location of at least one object in the at least one frame is based on object detection applied to the at least one frame, or is based on a transformation of a location of the at least one object detected in the reference frame.

In an embodiment, the processing circuitry is operative to estimate a transformation matrix based on reference key points derived from the reference frame and key points derived from the at least one frame. The transformation matrix defines a transformation of a location in the reference frame into a location in the at least one frame. The processing circuitry is also operative, in this embodiment, to decide, based on the at least one parameter, whether determination of the location of the at least one object in the at least one frame is based on the object detection applied to the at least one frame, or is based on the transformation, using the transformation matrix, of the location of the at least one object detected in the reference frame.

In an embodiment, the processing circuitry is also operative to decide, based on the at least one parameter derived from the transformation matrix, whether determination of the location of the at least one object in the at least one frame is based on the object detection applied to the at least one frame, or is based on the transformation, using the transformation matrix, of the location of the at least one object detected in the reference frame.

In an embodiment, the processing circuitry is operative to receive the at least one parameter from at least one sensor of a user device.

In an embodiment, the processing circuitry is operative to determine the location of the at least one object in the at least one frame based on the transformation of the location of the at least one object detected in the reference frame if any rotation of the scene represented by the at least one frame relative to the scene represented by the reference frame exceeds a threshold rotation, and otherwise determine the location of the at least one object in the at least one frame based on the object detection applied to the at least one frame if any zoom out of the scene represented by the at least one frame relative to the scene represented by the reference frame exceeds a threshold zoom out, and otherwise determine the location of the at least one object in the at least one frame based on the object detection applied to the at least one frame if any translation of the scene represented by the at least one frame relative to the scene represented by the reference frame exceeds a threshold translation, and otherwise determine the location of the at least one object in the at least one frame based on the transformation of the location of the at least one object detected in the reference frame.

In an embodiment, the processing circuitry is operative to compare the at least one parameter with a respective threshold value. The processing circuitry is also operative, in this embodiment, to decide, based on the comparison, whether determination of the location of the at least one object in the at least one frame is based on the object detection applied to the at least one frame, or is based on the transformation of the location of the at least one object detected in the reference frame.

In an embodiment, the at least one parameter comprises a rotation angle $\varphi$. The processing circuitry is operative, in this embodiment, to determine the location of the at least one object in the at least one frame based on the transformation of the location of the at least one object detected in the reference frame if $\varphi > \Theta_\varphi$ and otherwise determine the location of the at least one object in the at least one frame based on the object detection applied to the at least one frame. $\Theta_\varphi$ is a threshold value.

In an embodiment, the at least one parameter comprises a horizontal scaling factor $s_x$ and a vertical scaling factor $s_y$. The processing circuitry is operative, in this embodiment, to determine the location of the at least one object in the at least one frame based on the object detection applied to the at least one frame if $\sqrt{s_x^2 + s_y^2} < \Theta_s$ and otherwise determine the location of the at least one object in the at least one frame based on the transformation of the location of the at least one object detected in the reference frame. $\Theta_s$ is a threshold value.

In an embodiment, the at least one parameter comprises a horizontal translation $t_x$ and a vertical translation $t_y$. The processing circuitry is operative, in this embodiment, to determine the location of the at least one object in the at least one frame based on the object detection applied to the at least one frame if $\sqrt{t_x^2 + t_y^2} > \Theta_t$ and otherwise determine the location of the at least one object in the at least one frame based on the transformation of the location of the at least one object detected in the reference frame. $\theta_t$ is a threshold value.

In an embodiment, the at least one parameter comprises a horizontal scaling factor $s_x$, a vertical scaling factor $s_y$, a rotation angle $\varphi$, a horizontal translation $t_x$ and a vertical translation $t_y$. The processing circuitry is operative, in this embodiment, to determine the location of the at least one object in the at least one frame based on the transformation of the location of the at least one object detected in the reference frame if $\varphi > \theta_\varphi$, and otherwise determine the location of the at least one object in the at least one frame based on the object detection applied to the at least one frame if $\sqrt{s_x^{2+s_y^2}} < \theta_s$ or $\sqrt{t_x^2 + t_y^2} > \theta_t$, and otherwise determine the location of the location of the at least one object in the at least one frame based on the transformation of the location of the at least one object detected in the reference frame.

In an embodiment, the processing circuitry is operative to compare a time parameter $T_{elapsed}$, representing a time period from the reference frame to the at least one frame in the video stream, with a threshold value $\theta_{elapsed}$. The processing circuitry is also operative, in this embodiment, to determine the location of the at least one object in the at least one frame based on the object detection applied to the at least one frame if $T_{elapsed} > \theta_{elapsed}$ and otherwise decide, based on the at least one parameter, whether determination of the location of at least one object in the at least one frame is based on the object detection applied to the at least one frame, or is based on the transformation of the location of the at least one object detected in the reference frame.

In an embodiment, the processing circuitry is operative, in this embodiment, to determine the location of the at least one object in the at least one frame based on the transformation of the location of the at least one object detected in the reference frame if $\varphi > \theta_\varphi$, and otherwise determine the location of the at least one object in the at least one frame based on the object detection applied to the at least one frame if $\sqrt{s_x^{2+s_y^2}} < \theta_s$ or $\sqrt{t_x^2 + t_y^2} > \theta_t$ or $T_{elapsed} > \theta_{elapsed}$, and otherwise determine the location of the location of the at least one object in the at least one frame based on the transformation of the location of the at least one object detected in the reference frame.

In an embodiment, the processing circuitry is operative to decide, based on the at least one parameter, whether determination of a bounding box defining a region in the at least one frame is based on the object detection applied to the at least one frame, or is based on the transformation of a bounding box in the reference frame.

In an embodiment, the processing circuitry is operative to decide, based on the at least one parameter, whether to determine the bounding box defining a rectangular region in the at least one frame based on the object detection applied to the at least one frame or to determine the bounding box defining a quadrilateral region in the at least one frame based on the transformation of the bounding box in the reference frame.

In an embodiment, the processing circuitry is operative to augment the at least one frame with perceptual information based on the location of the at least one object in the at least one frame.

A further aspect of the embodiments relates to an object locator configured to decide, for at least one frame of a video stream and based on at least one parameter representative of a change between a scene represented by the at least one frame and a scene represented by a reference frame of the video stream, whether determination of a location of at least one object in the at least one frame is based on object detection applied to the at least one frame, or is based on a transformation of a location of the at least one object detected in the reference frame.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 15:
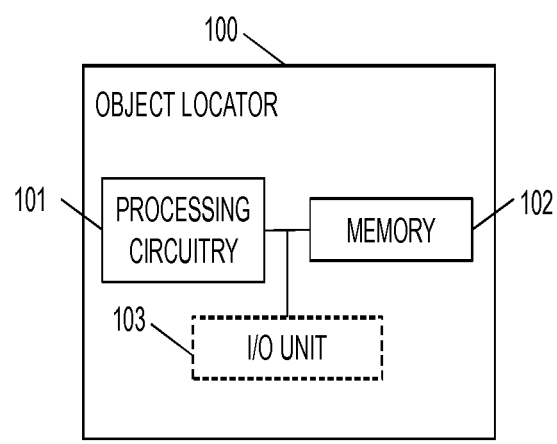
FIG. 15 is a block diagram of an object locator according to an embodiment.

FIG. 15 is a schematic block diagram illustrating an example of an object locator 100 according to an embodiment. In this particular example, the object locator 100 comprises a processing circuitry 101, such as a processor, and a memory 102. The memory 102 comprises instructions executable by the processing circuitry 101.

Optionally, the object locator 100 may also include a communication circuit, represented by a respective input/output (I/O) unit 103 in FIG. 15. The I/O unit 103 may include functions for wired and/or wireless communication with other devices, servers and/or network nodes in a wired or wireless communication network. In a particular example, the I/O unit 103 may be based on radio circuitry for communication with one or more other nodes, including transmitting and/or receiving information. The I/O unit 103 may be interconnected to the processing circuitry 101 and/or memory 102. By way of example, the I/O unit 103 may include any of the following: a receiver, a transmitter, a transceiver, I/O circuitry, input port(s) and/or output port(s).

Figure 16:
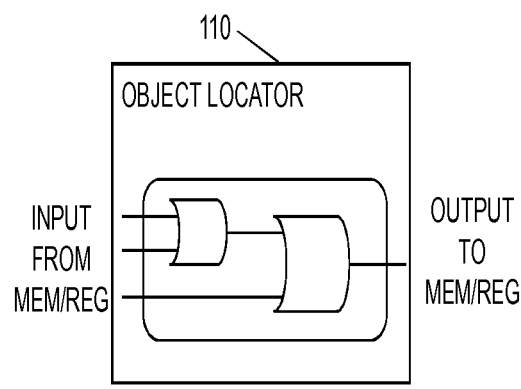
FIG. 16 is a block diagram of an object locator according to another embodiment.

FIG. 16 is a schematic block diagram illustrating an object locator 110 based on a hardware circuitry implementation according to an embodiment. Particular examples of suitable hardware circuitry include one or more suitably configured or possibly reconfigurable electronic circuitry, e.g., Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 17:
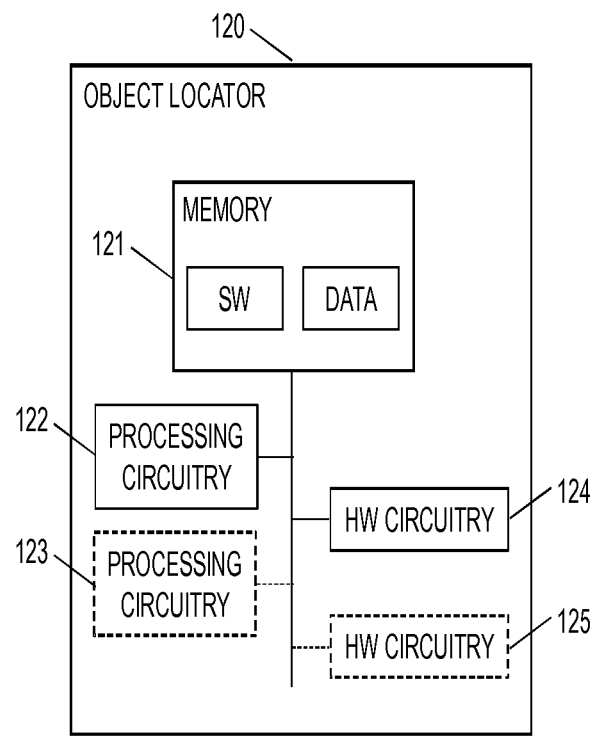
FIG. 17 is a block diagram of an object locator according to a further embodiment.

FIG. 17 is a schematic block diagram illustrating yet another example of an object locator based on combination of both processing circuitry/circuitries 122, 123 and hardware circuitry 124, 125 in connection with suitable memory unit(s) 121. The overall functionality is, thus, partitioned between programmed software for execution on one or more processing circuitries 122, 123 and one or more pre-configured or possibly reconfigurable hardware circuits 124, 125. The actual hardware-software partitioning can be decided by a system designer based on a number of factors including processing speed, cost of implementation and other requirements.

Figure 18:
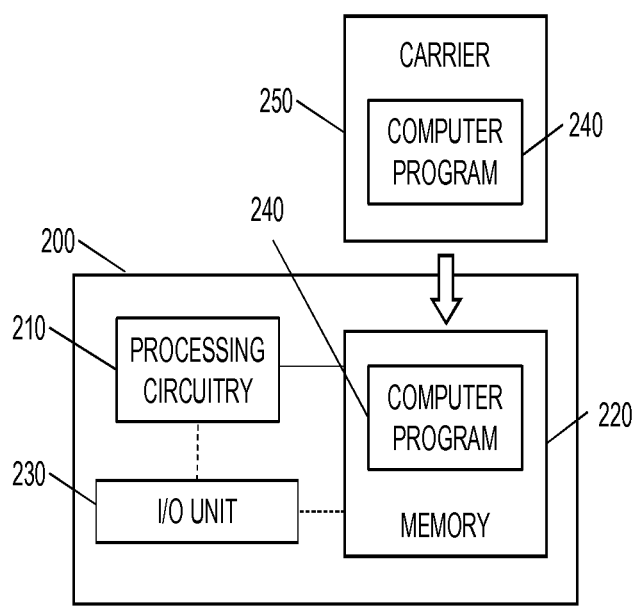
FIG. 18 schematically illustrates a computer program based implementation of an embodiment.

FIG. 18 is a computer program based implementation of an object locator 200 according to an embodiment. In this particular example, at least some of the steps, functions, procedures, modules and/or blocks described herein are implemented in a computer program 240, which is loaded into the memory 220 for execution by processing circuitry including one or more processing circuitries 210. The processing circuitry/circuitries 210 and memory 220 are interconnected to each other to enable normal software execution. An optional I/O unit 230 may also be interconnected to the processing circuitry/circuitries 210 and/or the memory 220 to enable input and/or output of relevant data, such as frames and detection information. The term 'processing circuitry' should be interpreted in a general sense as any circuitry, system or device capable of executing program code or computer program instructions to perform a particular processing, determining or computing task.

The processing circuitry 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by at least one processing circuitry 210, cause the at least one processing circuitry 210 to decide, for at least one frame of a video stream and based on at least one parameter representative of a change between a scene represented by the at least one frame and a scene represented by a reference frame of the video stream, whether determination of the location of the at least one object in the at least one frame is based on the object detection applied to the at least one frame, or is based on the transformation of the location of the at least one objected detected in the reference frame.

The proposed technology also provides a carrier 250, also referred to as computer program product, comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 stored on a computer-readable storage medium, such as the memory 220, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may, thus, be loaded into the operating memory 220 for execution by the processing circuitry 210.

The computer program product 250 has stored thereon a computer program 240 comprising instructions which, when executed on a processing circuitry 201, cause the processing circuitry to decide, for at least one frame of a video stream and based on at least one parameter representative of a change between a scene represented by the at least one frame and a scene represented by a reference frame of the video stream, whether determination of the location of the at least one object in the at least one frame is based on the object detection applied to the at least one frame, or is based on the transformation of the location of the at least one objected detected in the reference frame.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 19:
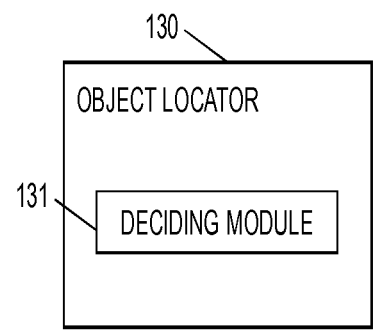
FIG. 19 is a block diagram of an object locator according to another embodiment.

FIG. 19 is a block diagram of an object locator 130. The object locator 130 comprises a deciding module 131 for deciding, for at least one frame of a video stream and based on at least one parameter representative of a change between a scene represented by the at least one frame and a scene represented by a reference frame of the video stream, whether determination of the location of the at least one object in the at least one frame is based on the object detection applied to the at least one frame, or is based on the transformation of the location of the at least one objected detected in the reference frame.

A further aspect relates to a user device 1, see FIGS. 1 and 2, comprising an object locator according to the invention, such as described in connection with any of FIGS. 15 to 19. In an embodiment, the user device 1 also comprises, or is connected to, a camera 2 configured to record video and generate a video stream. In an embodiment, the user device 1 also comprises, or is connected to, at least one sensor 2, 3 configured to generate the at least one parameter.

In an embodiment, the user device is selected from a group consisting of a computer, a laptop, a smart phone, a mobile phone, a tablet, a multimedia player, a set-top box, and a game console.

It is also becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources, such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software can be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and NIC(s), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a set of applications. In an example embodiment, each of the software containers, also called virtualization engines, virtual private servers, or jails, is a user space instance, typically a virtual memory space. These user space instances may be separate from each other and separate from the kernel space in which the operating system is executed. Then, the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

According to yet another embodiment, there is provided a hybrid network device, which includes both custom processing circuitry/proprietary OS and COTS processors/standard OS in a network device, e.g. in a card or circuit board within a network device. In certain embodiments of such a hybrid network device, a platform Virtual Machine (VM), such as a VM that implements functionality of a special-purpose network device, could provide for para-virtualization to the hardware present in the hybrid network device.

Figure 20:
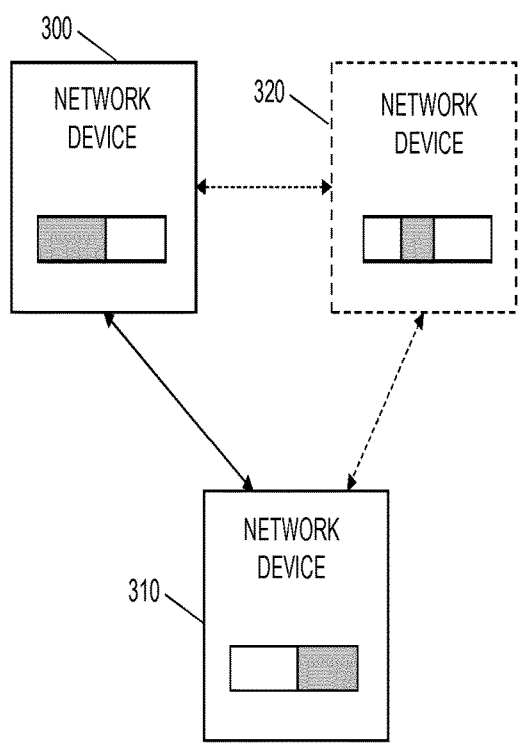
FIG. 20 schematically illustrates a distributed implementation among network devices.

FIG. 20 is a schematic diagram illustrating an example of how functionality can be distributed or partitioned between different network devices in a general case. In this example, there are at least two individual, but interconnected network devices 300, 310, which may have different functionalities, or parts of the same functionality, partitioned between the network devices 300, 310. There may be additional network device 320 being part of such a distributed implementation. The network devices 300, 310, 320 may be part of the same wireless or wired communication system, or one or more of the network devices may be so-called cloud-based network devices located outside of the wireless or wired communication system.

As used herein, the term "network device" may refer to any device located in connection with a communication network, including but not limited to devices in access networks, core networks and similar network structures. The term network device may also encompass cloud-based network devices.

Figure 21:
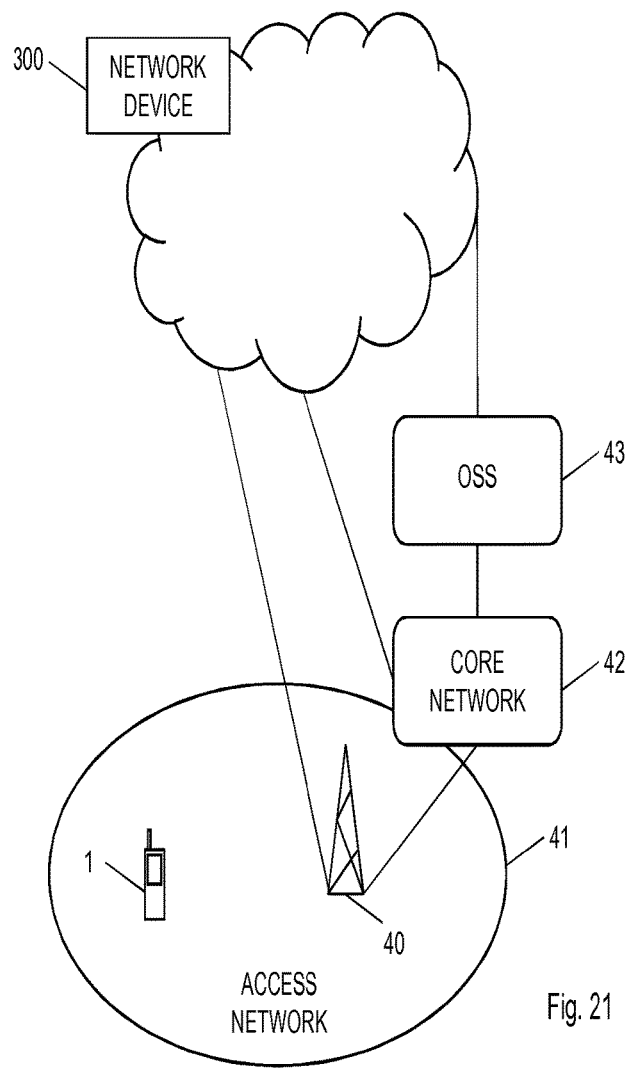
FIG. 21 is a schematic illustration of an example of a wireless communication system with one or more cloud-based network devices according to an embodiment.

FIG. 21 is a schematic diagram illustrating an example of a wireless communication system, including a radio access network (RAN) 41 and a core network 42 and optionally an operations and support system (OSS) 43 in cooperation with one or more cloud-based network devices 300. The figure also illustrates a user device 1, connected to the RAN 41 and capable of conducting wireless communication with a RAN node 40, such as a network node, a base station, node B (NB), evolved node B (eNB), next generation node B (gNB), etc.

The network device 300 illustrated as a cloud-based network device 300 in FIG. 21 may alternatively be implemented in connection with, such as at, the RAN node 40.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 22 and 23.

Figure 22:
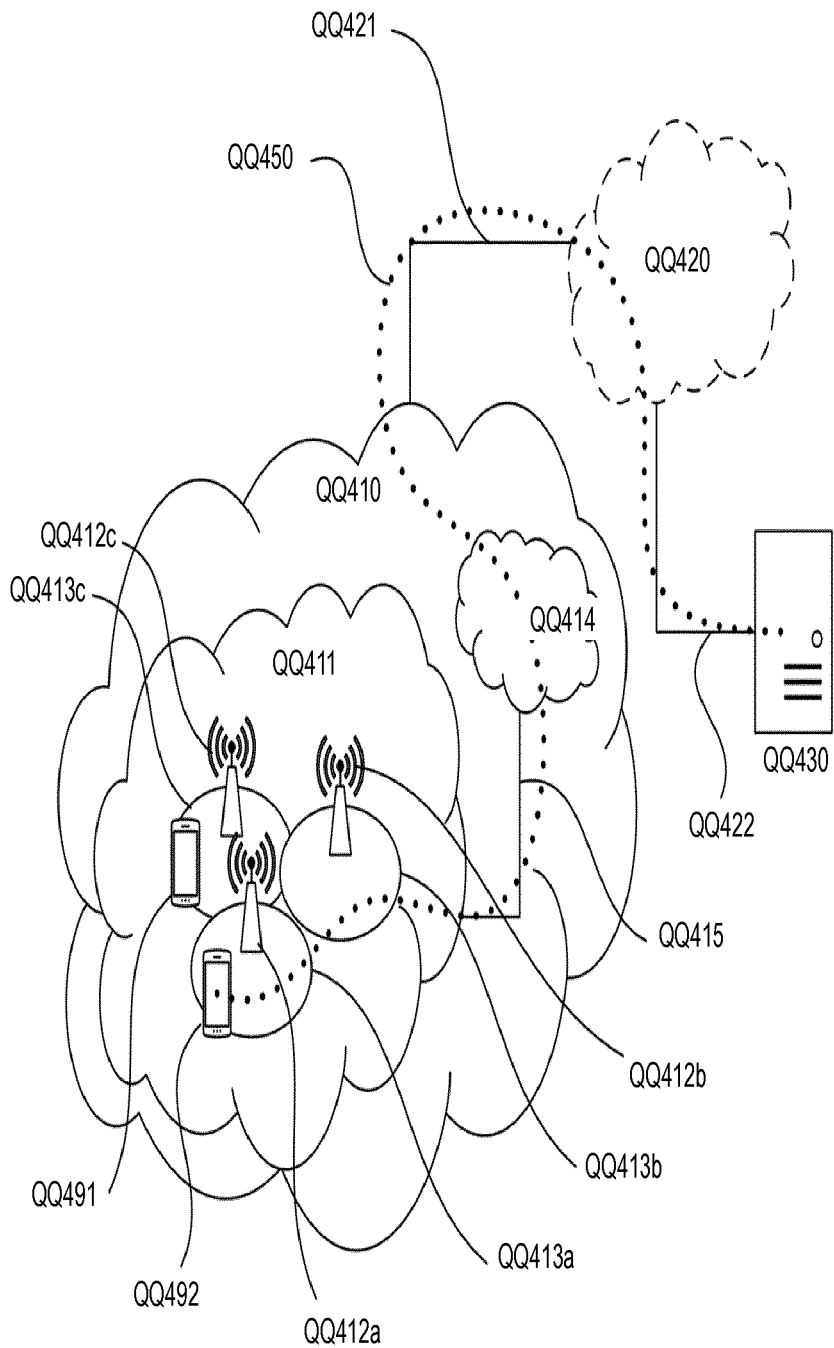
FIG. 22 is a schematic diagram illustrating an example of a telecommunication network connected via an intermediate network to a host computer in accordance with some embodiments.

FIG. 22 is a schematic diagram illustrating an example of a telecommunication network connected via an intermediate network to a host computer in accordance with some embodiments.

With reference to FIG. 22, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 22 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 23:
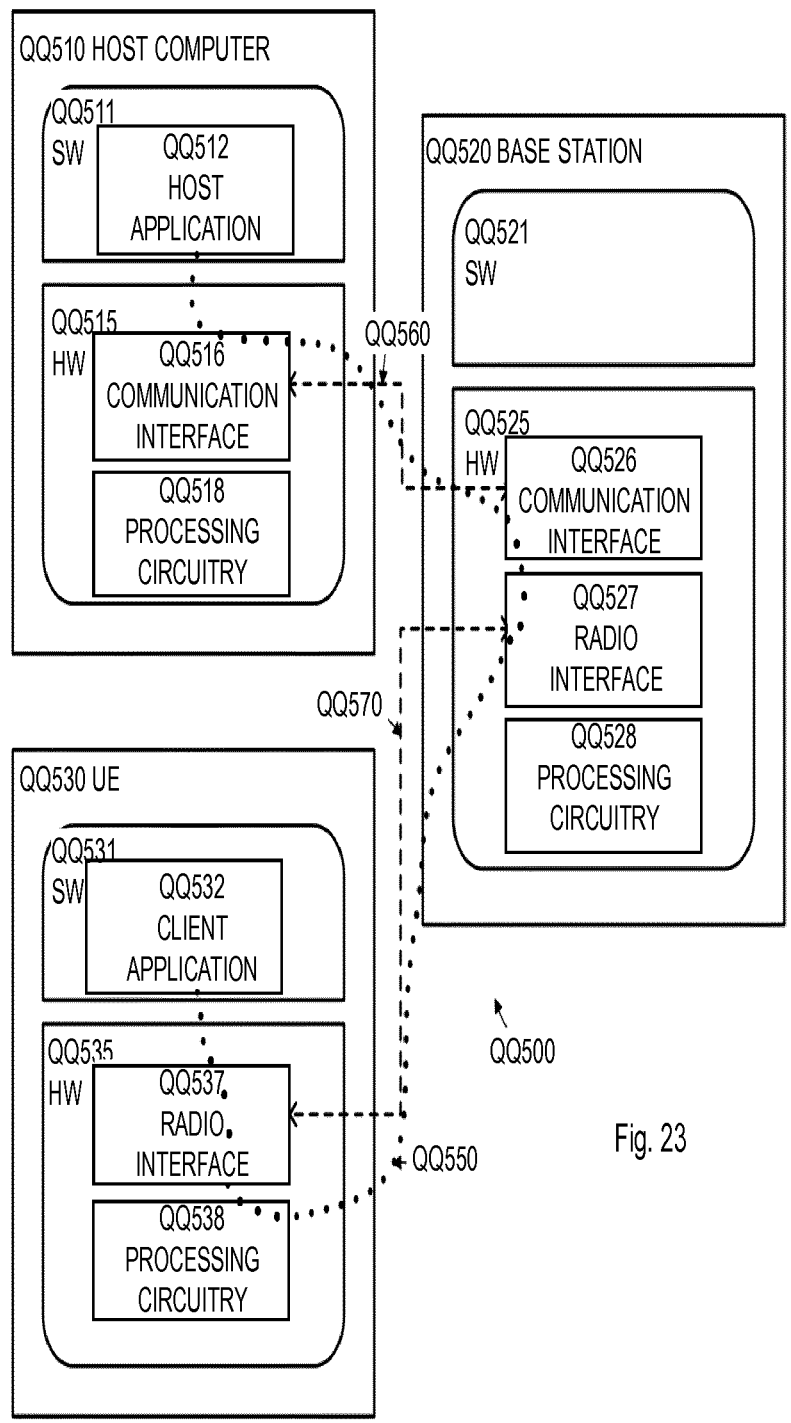
FIG. 23 is a schematic diagram illustrating an example of a host computer communicating via a base station with a user equipment over a partially wireless connection in accordance with some embodiments.

FIG. 23 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 23. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 23) served by base station QQ520. Communication interface QQ526 may be configured to facilitate connection QQ560 to host computer QQ510. Connection QQ560 may be direct or it may pass through a core network (not shown in FIG. 23) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 23 may be similar or identical to host computer QQ430, one of base stations QQ412*a*, QQ412*b*, QQ412*c* and one of UEs QQ491, QQ492 of FIG. 22, respectively. This is to say, the inner workings of these entities may be as shown in FIG. 23 and independently, the surrounding network topology may be that of FIG. 22.

In FIG. 23, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An object locator comprising:
 processing circuitry; and
 memory comprising instructions executable by the processing circuitry whereby the object locator is operative to:
  decide, for at least one frame of a video stream and based on at least one parameter representative of a change between a scene represented by the at least one frame and a scene represented by a reference frame of the video stream, whether determination of a location of at least one object in the at least one frame is based on object detection applied to the at least one frame, or is based on a transformation of a location of the at least one object detected in the reference frame, wherein the at least one parameter comprises one of:
   a rotation angle indicating a rotation of the scene represented by the at least one frame relative to the scene represented by the reference frame;
   a scaling factor indicating a zoom out of the scene represented by the at least one frame relative to the scene represented by the reference frame; and
   a translation factor indicating a translation of the scene represented by the at least one frame relative to the scene represented by the reference frame.

2. The object locator of claim 1, wherein the instructions are such that the processing circuitry is operative to:
 estimate a transformation matrix based on reference key points derived from the reference frame and key points derived from the at least one frame, wherein the transformation matrix defines a transformation of a location in the reference frame into a location in the at least one frame; and
 decide, based on the at least one parameter, whether determination of the location of the at least one object in the at least one frame is based on the object detection applied to the at least one frame, or is based on the transformation, using the transformation matrix, of the location of the at least one object detected in the reference frame.

3. The object locator of claim 2, wherein the instructions are such that the processing circuitry is operative to decide, based on the at least one parameter derived from the transformation matrix, whether determination of the location of the at least one object in the at least one frame is based on the object detection applied to the at least one frame, or is based on the transformation, using the transformation matrix, of the location of the at least one object detected in the reference frame.

4. The object locator of claim 1, wherein the instructions are such that the processing circuitry is operative to receive the at least one parameter from at least one sensor of a user device.

5. The object locator of claim 1, wherein the instructions are such that the processing circuitry is operative to:
 determine the location of the at least one object in the at least one frame based on the transformation of the location of the at least one object detected in the reference frame if any rotation of the scene represented by the at least one frame relative to the scene represented by the reference frame exceeds a threshold rotation; and otherwise
 determine the location of the at least one object in the at least one frame based on the object detection applied to the at least one frame if any zoom out of the scene represented by the at least one frame relative to the scene represented by the reference frame exceeds a threshold zoom out; and otherwise determine the location of the at least one object in the at least one frame based on the object detection applied to the at least one frame if any translation of the scene represented by the at least one frame relative to the scene represented by the reference frame exceeds a threshold translation; and otherwise determine the location of the at least one object in the at least one frame based on the transformation of the location of the at least one object detected in the reference frame.

6. The object locator of claim 1, wherein the instructions are such that the processing circuitry is operative to:

compare the at least one parameter with a respective threshold value; and decide, based on the comparison, whether determination of the location of the at least one object in the at least one frame is based on the object detection applied to the at least one frame, or is based on the transformation of the location of the at least one object detected in the reference frame.

7. The object locator of claim 6:

wherein the at least one parameter comprises a rotation angle q;

wherein the instructions are such that the processing circuitry is operative to determine the location of the at least one object in the at least one frame based on the transformation of the location of the at least one object detected in the reference frame if $\varphi > \theta_\varphi$;

otherwise determine the location of the at least one object in the at least one frame based on the object detection applied to the at least one frame; and wherein $\theta_\varphi$ is a threshold value.

8. The object locator of claim 6:

wherein the at least one parameter comprises a horizontal scaling factor sx and a vertical scaling factor $s_y$;

wherein the instructions are such that the processing circuitry is operative to determine the location of the at least one object in the at least one frame based on the object detection applied to the at least one frame if $\sqrt{(s_x^2+s_y^2)} < \theta_s$; otherwise determine the location of the at least one object in the at least one frame based on the transformation of the location of the at least one object detected in the reference frame; and wherein $\theta_s$ is a threshold value.

9. The object locator of claim 6:

wherein the at least one parameter comprises a horizontal translation $t_x$ and a vertical translation $t_y$;

wherein the instructions are such that the processing circuitry is operative to determine the location of the at least one object in the at least one frame based on the object detection applied to the at least one frame if $\sqrt{(t_x^2+t_y^2)} > \theta_t$; otherwise determine the location of the at least one object in the at least one frame based on the transformation of the location of the at least one object detected in the reference frame; and wherein $\theta_t$ is a threshold value.

10. The object locator of claim 6:

wherein the at least one parameter comprises a horizontal scaling factor $s_x$, a vertical scaling factor $s_y$, a rotation angle $\varphi$, a horizontal translation $t_x$ and a vertical translation $t_y$; and wherein the instructions are such that the processing circuitry is operative to:

determine the location of the at least one object in the at least one frame based on the transformation of the location of the at least one object detected in the reference frame if $\varphi > \theta_\varphi$, wherein $\theta_\varphi$ is a threshold value; and otherwise determine the location of the at least one object in the at least one frame based on the object detection applied to the at least one frame if $\sqrt{(s_x^2+s_y^2)} < \theta_s$ or $\sqrt{(t_x^2+t_y^2)} > \theta_t$, wherein $\theta_s$ and $\theta_t$ are threshold values; and otherwise; and determine the location of the location of the at least one object in the at least one frame based on the transformation of the location of the at least one object detected in the reference frame.

11. The object locator of claim 1, wherein the instructions are such that the processing circuitry is operative to:

compare a time parameter $T_{elapsed}$, representing a time period from the reference frame to the at least one frame in the video stream, with a threshold value $\theta_{elapsed}$; and determine the location of the at least one object in the at least one frame based on the object detection applied to the at least one frame if $T_{elapsed} > \theta_{elapsed}$; and otherwise decide, based on the at least one parameter, whether determination the location of at least one object in the at least one frame is based on the object detection applied to the at least one frame, or is based on the transformation of the location of the at least one object detected in the reference frame.

12. The object locator of claim 1, wherein the instructions are such that the processing circuitry is operative to decide, based on the at least one parameter, whether determination of a bounding box defining a region in the at least one frame is based on the object detection applied to the at least one frame, or is based on the transformation of a bounding box in the reference frame.

13. The object locator of claim 12, wherein the instructions are such that the processing circuitry is operative to decide, based on the at least one parameter, whether to determine the bounding box defining a rectangular region in the at least one frame based on the object detection applied to the at least one frame or to determine the bounding box defining a quadrilateral region in the at least one frame based on the transformation of the bounding box in the reference frame.

14. The object locator of claim 1, wherein the instructions are such that the processing circuitry is operative to augment the at least one frame with perceptual information based on the location of the at least one object in the at least one frame.

15. A user device comprising:

a camera configured to record video and generate a video stream;

an object locator, the object locator comprising processing circuitry and memory comprising instructions executable by the processing circuitry whereby the object locator is operative to:

decide, for at least one frame of a video stream and based on at least one parameter representative of a change between a scene represented by the at least one frame and a scene represented by a reference frame of the video stream, whether determination of a location of at least one object in the at least one frame is based on object detection applied to the at least one frame, or is based on a transformation of a location of the at least one object detected in the reference frame, wherein the at least one parameter comprises one of:

a rotation angle indicating a rotation of the scene represented by the at least one frame relative to the scene represented by the reference frame;

a scaling factor indicating a zoom out of the scene represented by the at least one frame relative to the scene represented by the reference frame; and a translation factor indicating a translation of the scene represented by the at least one frame relative to the scene represented by the reference frame.

16. The user device of claim 15, further comprising at least one sensor configured to generate the at least one parameter.

17. An object locating method, comprising:

deciding, for at least one frame of a video stream and based on at least one parameter representative of a change between a scene represented by the at least one frame and a scene represented by a reference frame of the video stream, whether determination of a location of at least one object in the at least one frame is based on object detection applied to the at least one frame, or is based on a transformation of a location of the at least one object detected in the reference frame, wherein the at least one parameter comprises one of:

a rotation angle indicating a rotation of the scene represented by the at least one frame relative to the scene represented by the reference frame;

a scaling factor indicating a zoom out of the scene represented by the at least one frame relative to the scene represented by the reference frame; and a translation factor indicating a translation of the scene represented by the at least one frame relative to the scene represented by the reference frame.

18. The method of claim 17, further comprising comparing the at least one parameter with a respective threshold value, wherein the deciding comprises deciding, based on the comparison, whether determination of the location of the at least one object in the at least one frame is based on the object detection applied to the at least one frame, or is based on the transformation of the location of the at least one object detected in the reference frame.

19. The method of claim 18:

wherein the at least one parameter comprises a rotation angle $\varphi$;

wherein the deciding comprises determining the location of the at least one object in the at least one frame based on the transformation of the location of the at least one object detected in the reference frame if $\varphi > \theta_\varphi$; otherwise determining the location of the at least one object in the at least one frame based on the object detection applied to the at least one frame; and wherein $\theta_\varphi$ is a threshold value.

20. A non-transitory computer readable recording medium storing a computer program product for controlling an object locator, the computer program product comprising program instructions which, when run on processing circuitry the object locator, causes the object locator to:

decide, for at least one frame of a video stream and based on at least one parameter representative of a change between a scene represented by the at least one frame and a scene represented by a reference frame of the video stream, whether determination of a location of at least one object in the at least one frame is based on the object locator applied to the at least one frame, or is based on a transformation of the location of the at least one object detected in the reference frame, wherein the at least one parameter comprises one of:

a rotation angle indicating a rotation of the scene represented by the at least one frame relative to the scene represented by the reference frame;

a scaling factor indicating a zoom out of the scene represented by the at least one frame relative to the scene represented by the reference frame; and a translation factor indicating a translation of the scene represented by the at least one frame relative to the scene represented by the reference frame.

\* \* \* \* \*